US012330865B1

(12) United States Patent
Day

(10) Patent No.: US 12,330,865 B1
(45) Date of Patent: Jun. 17, 2025

(54) PORTABLE BAG HANGING APPARATUS

(71) Applicant: Howard Day, Houston, TX (US)

(72) Inventor: Howard Day, Houston, TX (US)

(*) Notice: Subject to any disclaimer, the term of this patent is extended or adjusted under 35 U.S.C. 154(b) by 0 days.

(21) Appl. No.: 18/975,149

(22) Filed: Dec. 10, 2024

(51) Int. Cl.
*B65B 67/12* (2006.01)
*B60N 3/08* (2006.01)
*B65F 1/06* (2006.01)

(52) U.S. Cl.
CPC .................. *B65F 1/06* (2013.01); *B60N 3/08* (2013.01); *B65F 2001/061* (2013.01); *B65F 2210/18* (2013.01)

(58) Field of Classification Search
CPC .... B65F 1/06; B65F 1/0013; B65F 2001/061; B65F 2210/18; B60N 3/08; A45C 13/001; A45C 13/00; A45C 13/03; A45C 13/04; A45C 13/18; A45C 13/185; A47G 25/06; A47G 29/00; A47G 29/083; A47G 29/087; A47G 29/093; B65B 67/00; B65B 67/12; B60R 2011/0003; B60R 2011/0007
USPC ..................................................... 220/495.01
See application file for complete search history.

(56) References Cited

U.S. PATENT DOCUMENTS

| | | | | |
|---|---|---|---|---|
| 63,383 A * | 4/1867 | Hanks | ..................... | B65B 67/12 248/97 |
| 2,193,215 A * | 3/1940 | Witter | ................ | A47G 25/0692 211/117 |
| 3,814,359 A * | 6/1974 | Powell | .................... | B65B 67/12 473/487 |
| 5,246,190 A | 9/1993 | Swirkal | | |
| 5,259,497 A * | 11/1993 | Brothers | ................ | A45D 8/185 211/13.1 |
| 5,524,762 A | 6/1996 | Shafran et al. | | |

(Continued)

FOREIGN PATENT DOCUMENTS

JP 3238887 U 8/2022

OTHER PUBLICATIONS

Uknown, "Maximize Your Space with this 1pc Fabric Wardrobe Storage Hanging Bag", obtained from URL https://www.temu.com/1pc-fabric-wardrobe-storage-hanging-bag-door-rear-storage-bag-hanging-org on Jul. 26, 2023.anizer-wall-hanging-storage-bag-g-601099514840870.html.

(Continued)

*Primary Examiner* — Don M Anderson
*Assistant Examiner* — Elizabeth J Volz
(74) *Attorney, Agent, or Firm* — Basil M. Angelo; ANGELO IP

(57) ABSTRACT

A portable bag hanging apparatus may easily and securely attach to a wider variety of objects and enables more diverse use cases. The bag hanging apparatus includes a catch end and attachment end connected by first and second connectors made of soft, crushable, and collapsible material. The connectors may be secured between two objects with an interference fit while the catch end provides additional retention. Alternatively, the connectors may be wedged between two objects with something less than an interference fit, relying instead on the catch end to secure it in place. All exposed portions of the portable bag hanging apparatus are composed of soft material that is quiet when it comes into contact with other objects. In addition, the portable bag hanging apparatus is small, foldable, and virtually indestructible such that it may be easily stored and transported without risk of damaging it during travel.

20 Claims, 22 Drawing Sheets

(56) References Cited

U.S. PATENT DOCUMENTS

| | | | |
|---|---|---|---|
| 5,676,284 | A | 10/1997 | Schenberg |
| 6,488,241 | B1 | 12/2002 | Kyte et al. |
| 10,196,202 | B1 | 2/2019 | Clavizzao |
| 2005/0109802 | A1 | 5/2005 | Avery et al. |
| 2007/0278359 | A1 | 12/2007 | Kandah |
| 2009/0266858 | A1 | 10/2009 | Vander Sluis et al. |
| 2019/0380522 | A1 | 12/2019 | Johansson |

OTHER PUBLICATIONS

USPTO Notice of Allowance issued in U.S. Appl. No. 29/977,758, filed Dec. 10, 2024, mailed on Feb. 26, 2025.
USPTO Notice of Allowance issued in U.S. Appl. No. 29/977,747, filed Dec. 10, 2024, mailed on Feb. 26, 2025.

\* cited by examiner

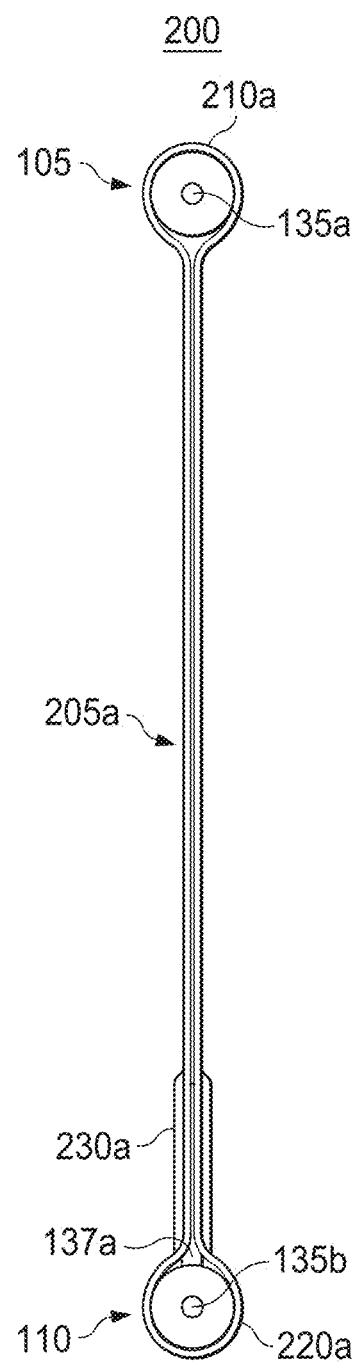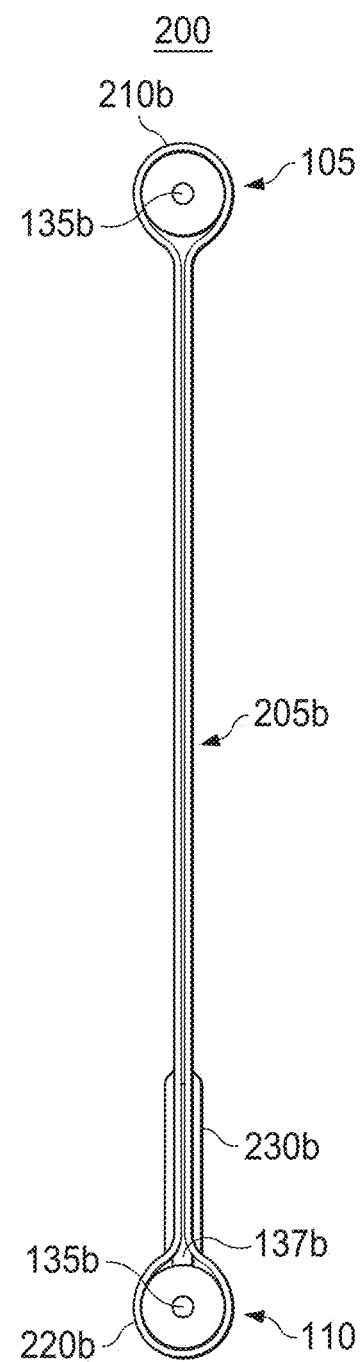
FIG. 3D                          FIG. 3E

PORTABLE BAG HANGING APPARATUS

BACKGROUND OF THE INVENTION

Commuters and other travelers typically spend extended periods of time traveling from one destination to another. Once they arrive at their destination, they often stay in temporary lodging for a period of time before returning home. For example, a business traveler may travel by air from one city to another, pick up a rental vehicle at the airport, drive to yet another city, and stay in a local hotel while calling on local customers, before returning home. During these travels, the traveler may wish to organize their belongings to ensure they are accessible during their travel. In addition, they may wish to dispose of the trash they generate in a tidy manner to prevent it from accumulating on the seats or the floor of their vehicle or hotel room. Conventional travel organizers seek to address these needs so as to make their travel more comfortable and enjoyable.

SUMMARY OF THE INVENTION

According to one aspect of one or more embodiments of the present invention, a portable bag hanging apparatus includes a catch end having a first support member disposed in a first soft outer member having a cylindrical shape, an attachment end having a second support member disposed in a second soft outer member having a cylindrical shape, a first cylindrical connector of soft, crushable, and collapsible material, where a first end of the first cylindrical connector is attached at an offset to a first distal end of the catch end and a second end of the first cylindrical connector is attached at an offset to a first distal end of the attachment end, and a second cylindrical connector of soft, crushable, and collapsible material, where a first end of the second cylindrical connector is attached at an offset to a second distal end of the catch end and a second end of the second cylindrical connector is attached at an offset to a second distal end of the attachment end. A first mounting post may be attached orthogonally to the second support member and at least partially disposed within the first cylindrical connector and a second mounting post may be attached orthogonally to the second support member and at least partially disposed within the second cylindrical connector. All exposed portions of the portable bag hanging apparatus are composed of soft material that is quiet when it comes into contact with other objects.

According to one aspect of one or more embodiments of the present invention, a portable bag hanging apparatus includes a catch end having a first support member disposed in a first soft outer member having a cylindrical shape, an attachment end having a second support member disposed in a second soft outer member having a cylindrical shape, a first fabric connector comprised of soft, crushable, and collapsible material, where a first end of the first fabric connector is attached at an offset to a first distal end of the catch end and a second end of the first fabric connector is attached at an offset to a first distal end of the attachment end, and a second fabric connector comprised of soft, crushable, and collapsible material, where a first end of the second fabric connector is attached at an offset to a second distal end of the catch end and a second end of the second fabric connector is attached at an offset to a second distal end of the attachment end. A first mounting post may be attached orthogonally to the second support member and at least partially disposed within the first fabric connector and a second mounting post may be attached orthogonally to the second support member and at least partially disposed within the second fabric connector. All exposed portions of the portable bag hanging apparatus are composed of soft material that is quiet when it comes into contact with other objects.

Other aspects of the present invention will be apparent from the following description and claims.

BRIEF DESCRIPTION OF THE DRAWINGS

FIG. 3D shows a left elevation view of a portable bag hanging apparatus in accordance with one or more embodiments of the present invention.

FIG. 3E shows a right elevation view of a portable bag hanging apparatus in accordance with one or more embodiments of the present invention.

DETAILED DESCRIPTION OF THE INVENTION

Figure 1A:
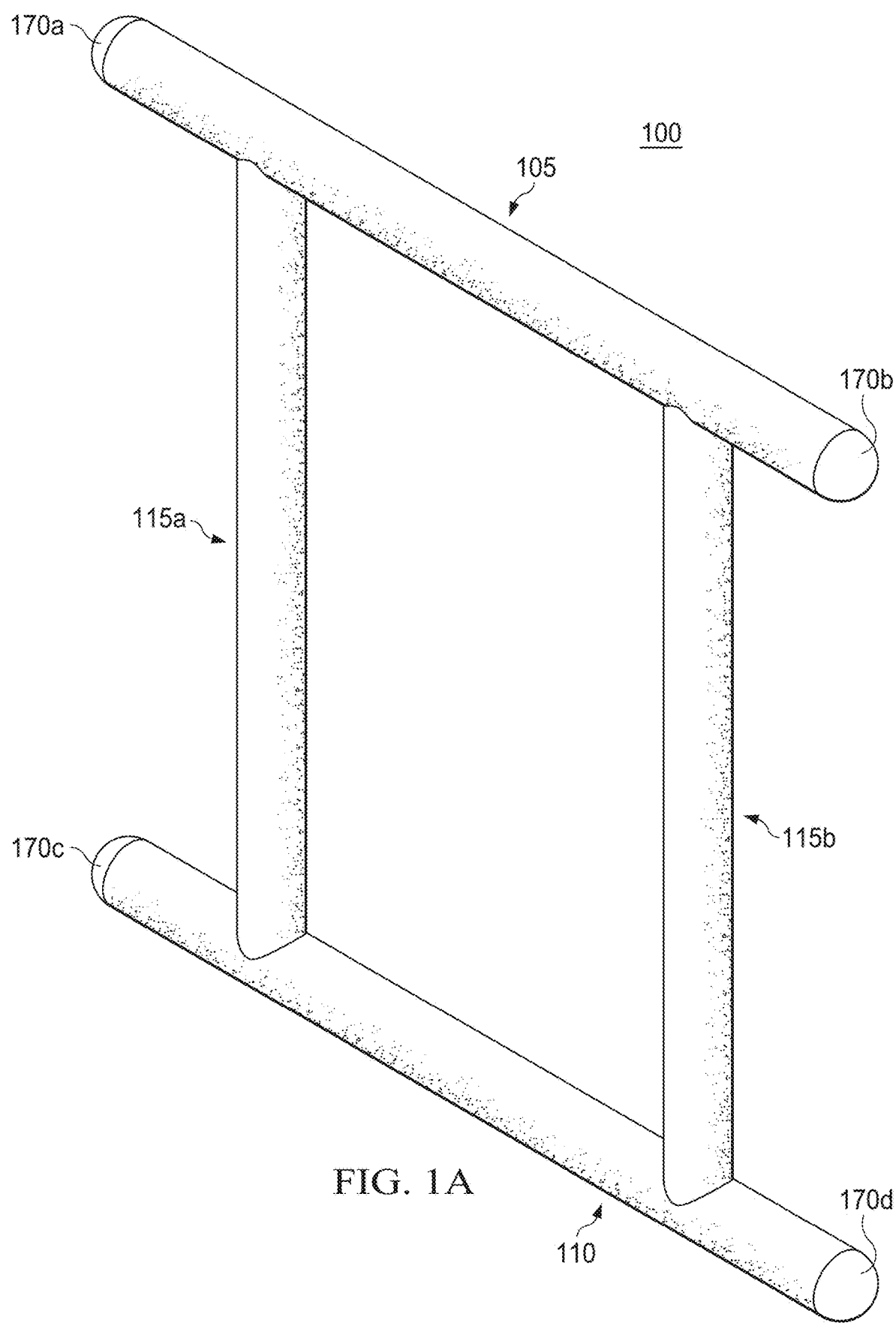
FIG. 1A shows a top-facing perspective view of portable bag hanging apparatus in accordance with one or more embodiments of the present invention.

One or more embodiments of the present invention are described in detail with reference to the accompanying figures. For consistency, like elements in the various figures are denoted by the same reference numerals. In the following detailed description of the present invention, specific details are described to provide a thorough understanding of the present invention. In other instances, aspects that are well-known to those of ordinary skill in the art are not described to avoid obscuring the description of the present invention.

Conventional travel organizers include headrest hooks, seat back organizers, and other hanging apparatus that physically attach to the headrest, center console, side window, door handles, or other feature of a vehicle. Headrest hooks typically include an attachment mechanism that attaches to the metal rods of the headrest and provides a hanging hook for various items. Seat back organizers hang from the front or back of the seats and typically provide multiple compartments to store belongings. Other hanging apparatus include storage nets, sun visor organizers, door pocket organizers, and rear-view mirror hooks that can be used to hang relatively small and lightweight items.

Notwithstanding, conventional travel organizers suffer from one or more of the following shortcomings that diminish their utility or preclude their use. Some conventional travel organizers use rigid attachment components that assume specific sizes or shapes of the object to which they are meant to attach, thereby limiting where they may be used. Some conventional travel organizers use plastic components that become brittle from sun exposure and are prone to breakage over time. Some conventional travel organizers use exposed plastic or metal components that make unpleasant noise when they come into contact with other objects during use, especially when used in moving vehicles. Some conventional travel organizers require a custom receiver for their specific attachment mechanism. Some conventional travel organizers, because of their design, cannot support sufficient weight. Some conventional travel organizers, because of their design, cannot maintain a grocery style bag in an open state. Some conventional travel organizers, because of their design or material composition, are large in size and difficult to store, transport, and use while traveling. Some conventional travel organizers require constant maintenance and cleaning. Some conventional travel organizers are not cost effective for use as a disposable or throw-away item.

Accordingly, in one or more embodiments of the present invention, a portable bag hanging apparatus may more easily and securely attach to a wider variety of objects and enables more diverse use cases. In certain applications, the soft, crushable, and collapsible connectors may be secured between two objects with an interference fit while the catch end provides additional retention should it move. In other applications, the soft, crushable, and collapsible connectors may be wedged between two objects with something less than an interference fit, relying instead upon the catch end to catch between the two objects thereby securing its position in place. As such, the portable bag hanging apparatus may be secured in place in virtually all environments. All exposed portions of the portable bag hanging apparatus are composed of soft material that is quiet when it comes into contact with other objects. Advantageously, the portable bag hanging apparatus may be used in a variety of applications, including those that anticipate movement and contact with other objects, without disturbing the peace. In addition, the portable bag hanging apparatus is small, foldable, and virtually indestructible such that it may be easily stored and transported without risk of damaging it during travel. The small and foldable nature of the portable bag hanging apparatus substantially reduces the footprint when not in use and permits easy storage for travel. In addition, the soft exterior facing materials of a portable bag hanging apparatus may be provided in a variety of colorways to ensure aesthetic compatibility with its intended environment of use. In addition, a portable bag hanging apparatus is inexpensive and cost-effective for use as a disposable or throw-away item.

FIG. 1A shows a top-facing perspective view of portable bag hanging apparatus 100 in accordance with one or more embodiments of the present invention. Portable bag hanging apparatus 100 may include a catch end 105 that serves as a physical catch to retain portable bag hanging apparatus in place when in operative use (e.g., FIGS. 2A-2D) and an attachment end 110 that serves as a platform of attachment for bags (e.g., FIG. 2A-2D), garments, and other hanging items. Catch end 105 may be attached to attachment end 110 by a pair of soft, crushable, and collapsible cylindrical connectors 115a, 115b that are spaced apart from one another, but offset from the distal ends of catch end 105 and attachment end 110 as shown. In the context of the present invention, soft describes the texture and feel, crushable describes the materials ability to be compressed or deformed under pressure without breaking and capable of returning to their original shape when the pressure is removed, and collapsible describes the ability to be folded or compacted into a smaller size for storage or transport.

In certain applications, first cylindrical connector 115a and second cylindrical connector 115b may be squeezed and secured in place between two objects, such as, for example, a closed glovebox (e.g., FIG. 2A), cabinet (e.g., FIG. 2B), or drawer (e.g., FIG. 2C), with an interference fit to secure it in place and, because catch end 105 is disposed on one side of the interference fit, catch end 105 provides additional retention should apparatus 100 move while traveling or under load. In other applications, first cylindrical connector 115a and second cylindrical connector 115b may be wedged between two objects with something less than an interference fit, relying instead upon the geometry of catch end 105 to catch on an object that prevents apparatus 100 from moving, thereby securing it in place. In still other applications, portable bag hanging apparatus 100 may be wrapped around a bar (e.g., FIG. 2D) and secured in place by threading catch end 105 in the gap between first cylindrical connector 115a and second cylindrical connector 115b. For aesthetic appeal, optional end caps 170a and 170b may be removably disposed, or integrally formed, on opposing distal ends of catch end 105 and optional end caps 170c and 170d may be removably disposed, or integrally formed, on opposing distal ends of attachment end 110.

Figure 1B:
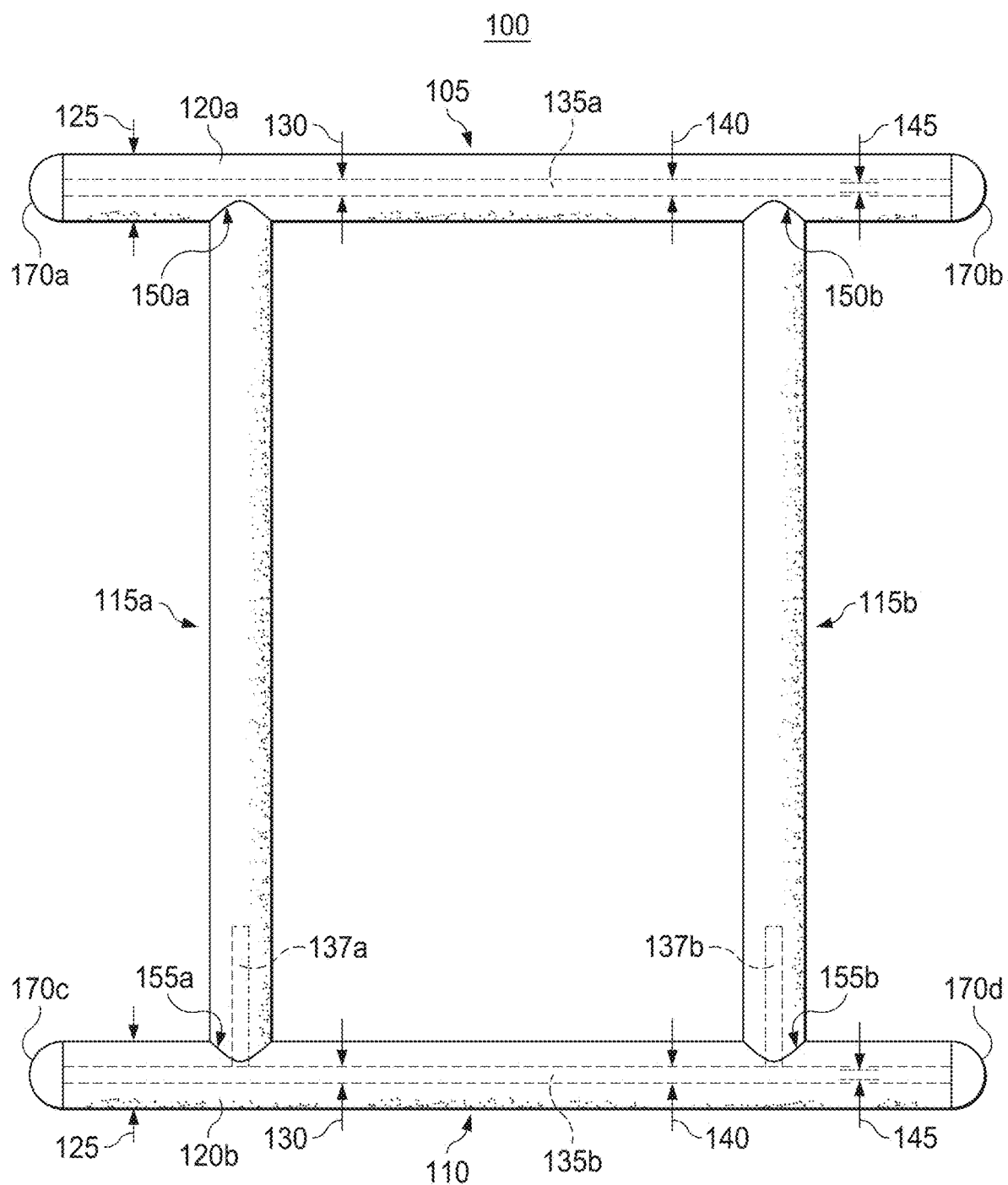
FIG. 1B shows a front elevation view of a portable bag hanging apparatus in accordance with one or more embodiments of the present invention.

Continuing, FIG. 1B shows a front elevation view of portable bag hanging apparatus 100 in accordance with one or more embodiments of the present invention. Catch end 105 may include a first support member 135a disposed in a first soft outer member 120a having a cylindrical shape. Similarly, attachment end 110 may include a second support member 135b disposed in a second soft outer member 120b having a cylindrical shape. In certain embodiments, intended for use with disposable, recyclable, or biodegradable grocery style bags, first soft outer member 120a and second soft outer member 120b may each have a length in a range between 8 inches and 12 inches. In other embodiments, first soft outer member 120a and second soft outer member 120b may each have a length in a range between 4 inches and 16 inches. In still other embodiments first soft outer member 120a and second soft outer member 120b may each have a length in a range between 2 inches and 20 inches. One of ordinary skill in the art, having the benefit of this disclosure, will recognize that the length of soft outer members 120a, 120b may vary based on an application or design in accordance with one or more embodiments of the present invention. The first end of first cylindrical connector 115a may attach at offset 150a to a first distal end of catch end 105 and the second end of first cylindrical connector 115a may attach at offset 155a to a first distal end of attachment end 110. Similarly, the first end of second cylindrical connector 115b may attach at offset 150b to a second distal end of catch end 105 and a second end of second cylindrical connector 115b may attach at offset 155b to a second distal end of attachment end 110. In certain embodiments, offsets 150a, 150b, 155a, 155b may be in a range between 1 inch and 3 inches. In other embodiments, offsets 150a, 150b, 155a, 155b may be in a range between 1 inch and 6 inches. In still other embodiments, the offsets 150a, 150b, 155a, 155b may be in a range between 1 inch and 9 inches. One of ordinary skill in the art, having the benefit of this disclosure, will recognize that offsets 150a, 150b, 155a, 155b may vary based on an application or design in accordance with one or more embodiments of the present invention.

In certain embodiments, intended for use with disposable, recyclable, or biodegradable grocery style plastic bags, first cylindrical connector 115a and second cylindrical connector 115b may each have a length in a range between 8 inches and 12 inches. In other embodiments, first cylindrical connector 115a and second cylindrical connector 115b may each have a length in a range between 4 inches and 16 inches. In still other embodiments, first cylindrical connector 115a and second cylindrical connector 115b may each have a length in a range between 2 inches and 20 inches. One of ordinary skill in the art, having the benefit of this disclosure, will recognize that the length of cylindrical connectors 115a, 115b may vary based on an application or design in accordance with one or more embodiments of the present invention. A first mounting post 137a may be attached orthogonally to second support member 135b and at least partially disposed within first cylindrical connector 115a as shown. A second mounting post 137b may be attached orthogonally to second support member 135b and at least partially disposed within second cylindrical connector 115b as shown. The portion of attachment end 110 in between first mounting post 137a and the first distal end (e.g., 170c) of attachment end 110, in conjunction with the rigidity of first mounting post 137a, form a first point of attachment as described in more detail herein. Similarly, the portion of attachment end 110 in between second mounting post 137b and the second distal end (e.g., 170d) of attachment end 110, in conjunction with the rigidity of second mounting post 137b, form a second point of attachment as described in more detail herein.

Figure 1C:
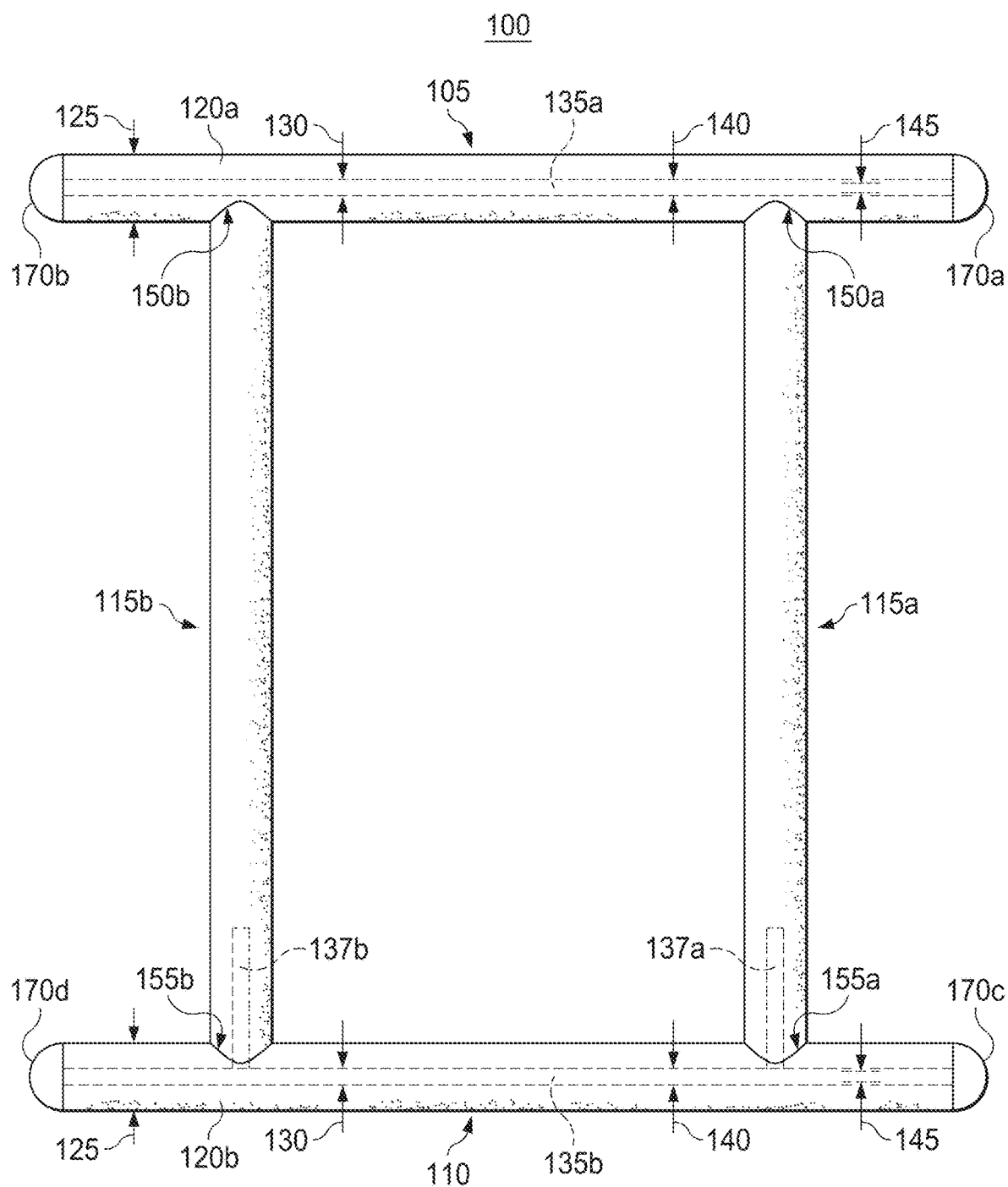
FIG. 1C shows a rear elevation view of a portable bag hanging apparatus in accordance with one or more embodiments of the present invention.

Continuing, FIG. 1C shows a rear elevation view of a portable bag hanging apparatus 100 in accordance with one or more embodiments of the present invention. In certain embodiments, intended for use with disposable, recyclable, or biodegradable grocery style bags, first soft outer member 120a of catch end 105 may have an outer diameter 125 in a range between ½ inch and 1 inch. In other embodiments, catch end 105 may have an outer diameter 125 in a range between ⅜ inch and ¾ inch. In still other embodiments, catch end 105 may have an outer diameter 125 in a range between ¼ inch and ⅞ inch. One of ordinary skill in the art, having the benefit of this disclosure, will recognize that the outer diameter 125 of catch end 105 may vary based on an application or design in accordance with one or more embodiments of the present invention. In certain embodiments, first soft outer member 120a of catch end 105 may have an inner diameter cutout 130 in a range between 5/16 inch and ½ inch, configured to receive first support member 135a. In other embodiments, first soft outer member 120a of catch end 105 may have an inner diameter cutout 130 in a range between ¼ inch and ½ inch. In still other embodiments, first soft outer member 120a of catch end 105 may have an inner diameter cutout 130 in a range between ⅛ inch and ¾ inch. One of ordinary skill in the art, having the benefit of this disclosure, will recognize that the inner diameter cutout 130 of first soft outer member 120a of catch end 105 may vary based on an application or design in accordance with one or more embodiments of the present invention.

First support member 135a may have an outer diameter 140 matching or slightly larger than that of the inner diameter cutout 130 of first soft outer member 120a of catch end 105, sufficient to form an interference fit when inserted into first soft outer member 120a. In certain embodiments, first support member 135a may have outer diameter 140 in a range between 5/16 inch and ½ inch. In other embodiments, first support member 135a may have outer diameter 140 in a range between ¼ inch and ½ inch. In still other embodiments, first support member 135a may have outer diameter 140 in a range between ⅛ inch and ¾ inch. One of ordinary skill in the art, having the benefit of this disclosure, will recognize that the outer diameter 140 of first support member 135a may vary based on an application or design in accordance with one or more embodiments of the present invention. First support member 135a may have a material composition that is flexible, semi-rigid, or rigid, to provide the requisite structure, for a given application or design. For example, first support member 135a may be composed of carbon fiber, fiberglass, wood, plastic, plastic composites, composite materials, metals, or metal alloys, depending on an application or design. First support member 135a may optionally have a centerline cutout 145 to reduce weight and material cost.

In certain embodiments, intended for use with disposable, recyclable, or biodegradable grocery style bags, second soft outer member 120b of attachment end 110 may have an outer diameter 125 in a range between ½ inch and 1 inch. In other embodiments, attachment end 110 may have an outer diameter 125 in a range between ⅜ inch and ⅝ inch. In still other embodiments, attachment end 110 may have an outer diameter 125 in a range between ¼ inch and ⅝ inch. One of ordinary skill in the art, having the benefit of this disclosure, will recognize that the outer diameter 125 of second soft outer member 120b of attachment end 110 may vary based on an application or design in accordance with one or more embodiments of the present invention. In certain embodiments, second soft outer member 120b of attachment end 110 may have an inner diameter cutout 130 in a range between ⁵⁄₁₆ inch and ½ inch, configured to receive second support member 135b. In other embodiments, second soft outer member 120b of attachment end 110 may have an inner diameter cutout 130 in a range between ¼ inch and ½ inch, configured to receive second support member 135b. In still other embodiments, second soft outer member 120b of attachment end 110 may have an inner diameter cutout 130 in a range between ⅛ inch and ¾ inch, configured to receive second support member 135b. One of ordinary skill in the art, having the benefit of this disclosure, will recognize that the inner diameter cutout 130 of second soft outer member 120b of attachment end 110 may vary based on an application or design in accordance with one or more embodiments of the present invention.

Second support member 135b may have an outer diameter 140 matching or slightly larger than that of the inner diameter cutout 130 of second soft outer member 120b of attachment end 110, sufficient to form an interference fit when inserted into second soft outer member 120b. In certain embodiments, second support member 135b may have an outer diameter 140 in a range between ⁵⁄₁₆ inch and ½ inch. In other embodiments, second support member 135b may have an outer diameter 140 in a range between ¼ inch and ½ inch. In still other embodiments, second support member 135b may an outer diameter 140 in a range between ⅛ inch and ¾ inch. One of ordinary skill in the art, having the benefit of this disclosure, will recognize that the outer diameter 140 of second support member 135b may vary based on an application or design in accordance with one or more embodiments of the present invention. Second support member 135b may have a material composition that is flexible, semi-rigid, or rigid, to provide the requisite structure, for a given application or design. For example, second support member 135b may be composed of carbon fiber, fiberglass, wood, plastic, plastic composites, composite materials, metals, or metal alloys, depending on an application or design. Second support member 135b may optionally have a centerline cutout 145 to reduce weight and material cost.

Figure 1D:
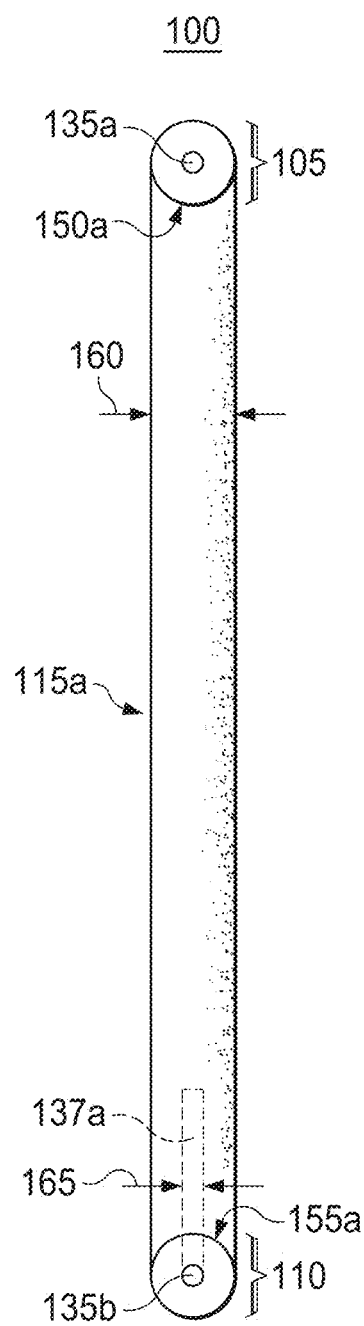
FIG. 1D shows a left elevation view of a portable bag hanging apparatus in accordance with one or more embodiments of the present invention.
Figure 1E:
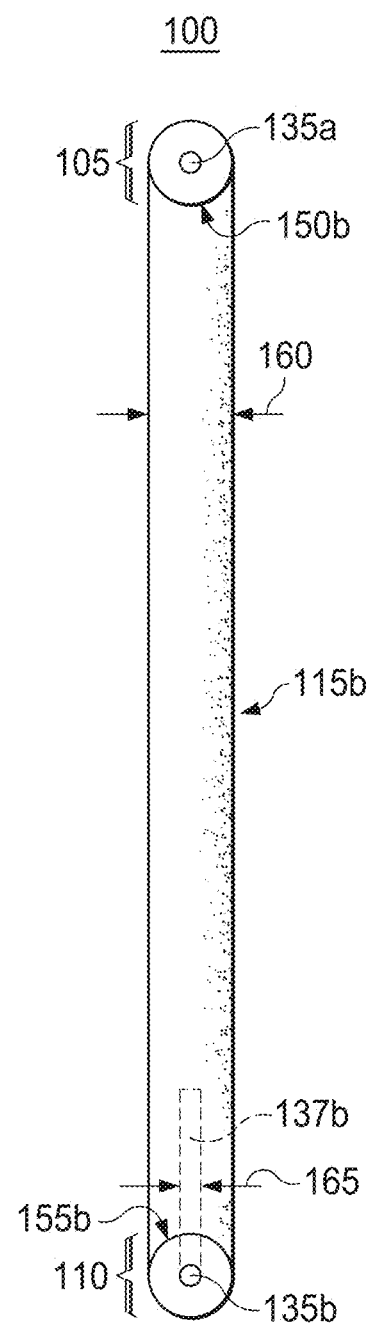
FIG. 1E shows a right elevation view of a portable bag hanging apparatus in accordance with one or more embodiments of the present invention.
Figure 1F:
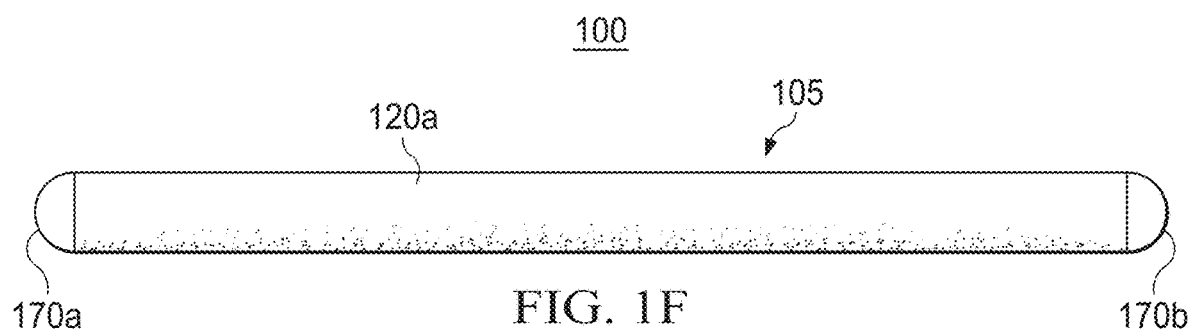
FIG. 1F shows a top plan view of a portable bag hanging apparatus in accordance with one or more embodiments of the present invention.
Figure 1G:
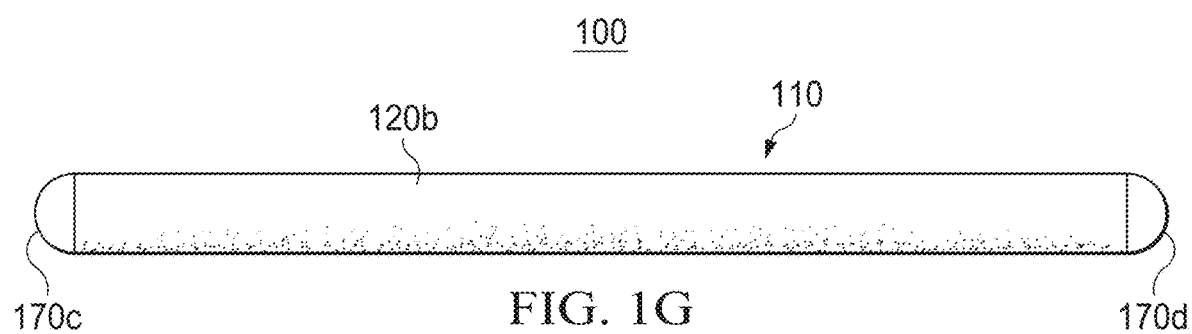
FIG. 1G shows a bottom plan view of a portable bag hanging apparatus in accordance with one or more embodiments of the present invention.

Continuing, FIG. 1D shows a left elevation view of portable bag hanging apparatus 100 in accordance with one or more embodiments of the present invention. In certain embodiments, first cylindrical connector 115a may have an outer diameter 160 in a range between ½ inch and 1 inch. In other embodiments, first cylindrical connector 115a may have an outer diameter 160 in a range between ⅜ inch and ⅝ inch. In still other embodiments, first cylindrical connector 115a may have an outer diameter 160 in a range between ¼ inch and ⅝ inch. One of ordinary skill in the art, having the benefit of this disclosure, will recognize that outer diameter 160 of first cylindrical connector 115a may vary based on an application or design in accordance with one or more embodiments of the present invention. Similarly, in certain embodiments, second cylindrical connector 115b may have an outer diameter 160 in a range between ⅜ inch and ⅝ inch. In still other embodiments, second cylindrical connector 115b may have an outer diameter 160 in a range between ¼ inch and ⅝ inch. One of ordinary skill in the art, having the benefit of this disclosure, will recognize that outer diameter 160 of second cylindrical connector 115b may vary based on an application or design in accordance with one or more embodiments of the present invention. In certain embodiments, first mounting post 137a and second mounting post 137b may each have a length in a range between 1 inch and 4 inches and an outer diameter 165 in a range between ⅛ inch and 1 inch. One of ordinary skill in the art, having the benefit of this disclosure, will recognize that the length and outer diameter 165 of the first and second mounting posts 137a, 137b may vary based on an application or design in accordance with one or more embodiments of the present invention. Continuing, FIG. 1E shows a right elevation view of portable bag hanging apparatus 100 in accordance with one or more embodiments of the present invention. Continuing, FIG. 1F shows a top plan view of portable bag hanging apparatus 100 in accordance with one or more embodiments of the present invention. Continuing, FIG. 1G shows a bottom plan view of a portable bag hanging apparatus 100 in accordance with one or more embodiments of the present invention.

Figure 1H:
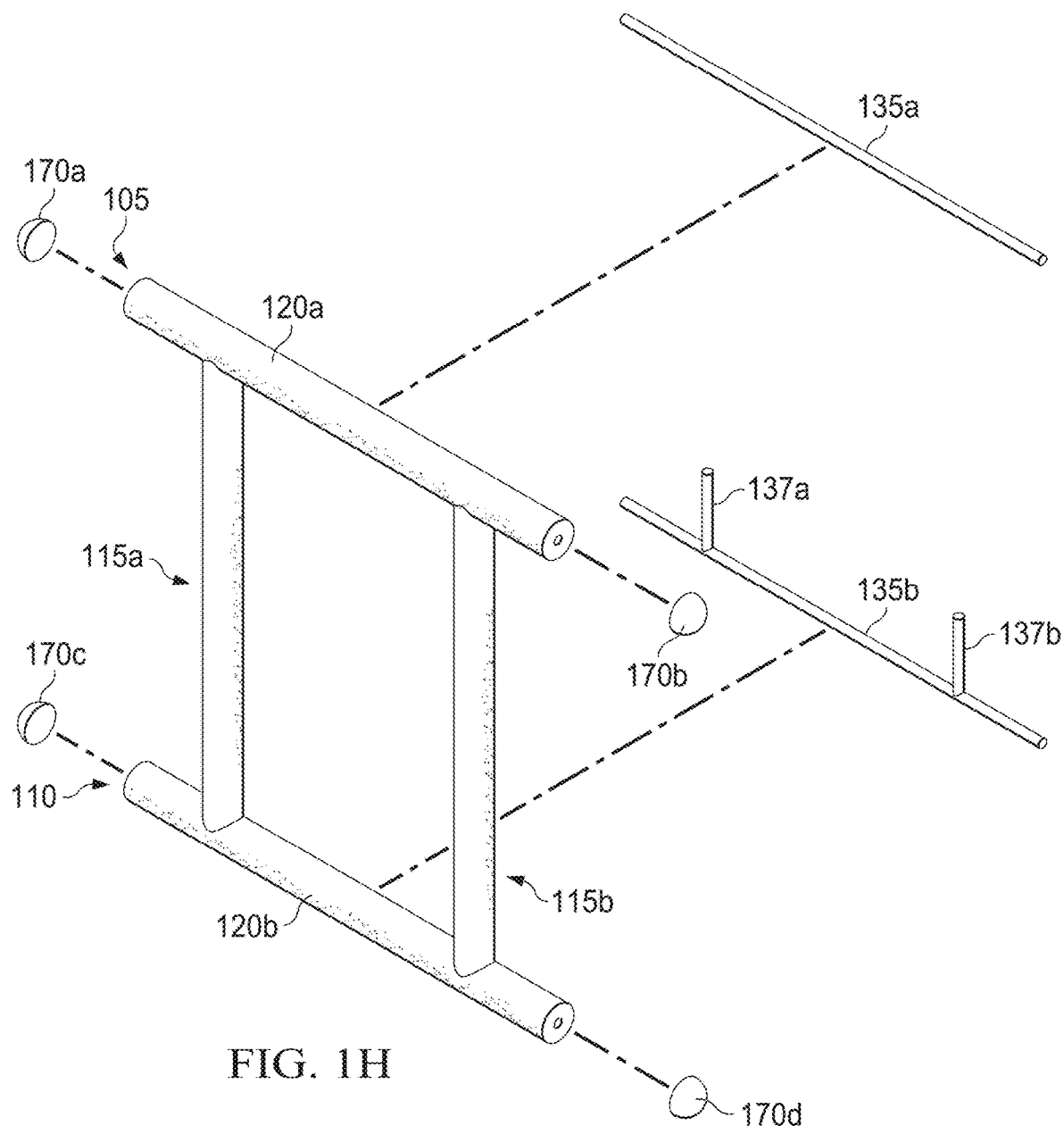
FIG. 1H shows an exploded view of a portable bag hanging apparatus in accordance with one or more embodiments of the present invention.

Continuing, FIG. 1H shows an exploded view of portable bag hanging apparatus 100 in accordance with one or more embodiments of the present invention. First support member 135a may be inserted into the inner diameter (e.g., 130 of FIG. 1B) of first soft outer member 120a of catch end 105 and secured in place by the interference fit. Second support member 135b may be inserted into the inner diameter (e.g., 130 of FIG. 1B) of second soft outer member 120b of attachment end 110 and secured in place by the interference fit. Optional end caps 170a and 170b may be removably disposed, or integrally formed, on opposing distal ends of catch end 105 and optional end caps 170c and 170d may be removably disposed, or integrally formed, on opposing distal ends of attachment end 110.

Figure 2A:
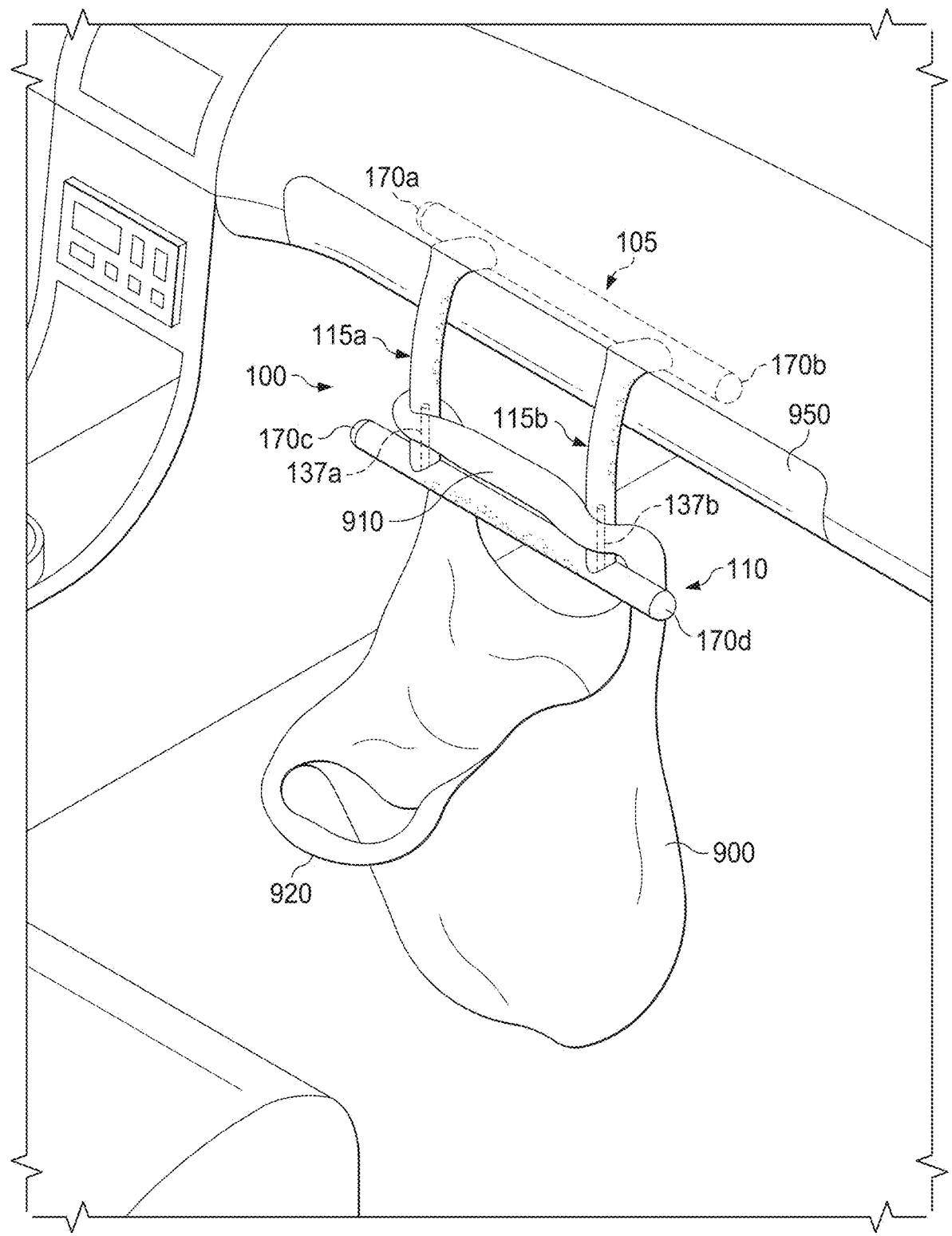
FIG. 2A shows a portable bag hanging apparatus in an exemplary environment of use with a glovebox in accordance with one or more embodiments of the present invention.

FIG. 2A shows a portable bag hanging apparatus 100 in an exemplary environment of use with a glovebox 950 in accordance with one or more embodiments of the present invention. In certain applications, catch end 105 may be disposed in the interior of an automotive glovebox such that glovebox door 950 closes on first cylindrical connector 115a and second cylindrical connector 115b. Because first cylindrical connector 115a and second cylindrical connector 115b are soft, crushable, and collapsible, the closure of glovebox door 950 creates an interference fit retaining portable bag hanging apparatus 100 in place. However, should portable bag hanging apparatus 100 move due to travel or under load, catch end 105 prevents portable bag hanging apparatus 100 from further movement, thereby retaining it in place. Disposable, recyclable, or biodegradable grocery style bag 900 includes a first handle 910 and a second handle 920. Either handle 910 or 920 (first handle 910 shown) may be wrapped around the points of attachment formed by first mounting post 137a and the first distal end (e.g., 170c) of attachment end 110 that extends beyond first mounting post 137a and second mounting post 137b and the second distal end (e.g., 170d) of attachment end 110 that extends beyond second mounting post 137b, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137*a* and second mounting post 137*b* may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 100 are composed of soft material, portable bag hanging apparatus 100 is quiet when it comes into contact with other objects.

Figure 2B:
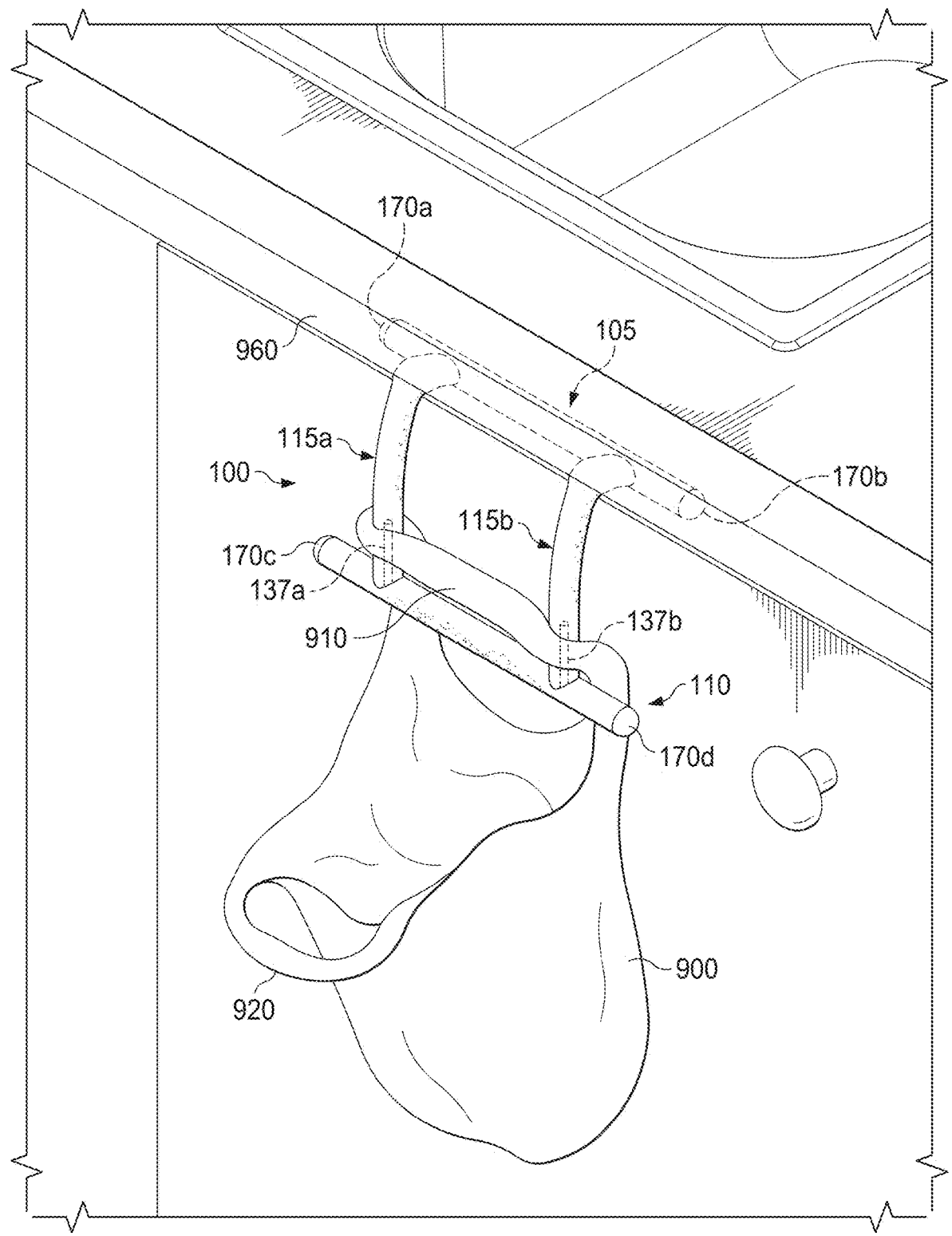
FIG. 2B shows a portable bag hanging apparatus in an exemplary environment of use with a cabinet door in accordance with one or more embodiments of the present invention.

Continuing, FIG. 2B shows a portable bag hanging apparatus 100 in an exemplary environment of use with a cabinet 960 in accordance with one or more embodiments of the present invention. In certain applications, catch end 105 may be disposed in the interior of a cabinet such that cabinet door 960 closes on first cylindrical connector 115*a* and second cylindrical connector 115*b*. Because first cylindrical connector 115*a* and second cylindrical connector 115*b* are soft, crushable, and collapsible, the closure of cabinet door 960 creates an interference fit retaining portable bag hanging apparatus 100 in place. However, should portable bag hanging apparatus 100 move under load, catch end 105 prevents portable bag hanging apparatus 100 from further movement, thereby retaining it in place. Disposable, recyclable, or biodegradable grocery style bag 900 includes a first handle 910 and a second handle 920. Either handle 910 or 920 (first handle 910 shown) may be wrapped around the points of attachment formed by first mounting post 137*a* and the first distal end (e.g., 170*c*) of attachment end 110 that extends beyond first mounting post 137*a* and second mounting post 137*b* and the second distal end (e.g., 170*d*) of attachment end 110 that extends beyond second mounting post 137*b*, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137*a* and second mounting post 137*b* may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 100 are composed of soft material, portable bag hanging apparatus 100 is quiet when it comes into contact with other objects.

Figure 2C:
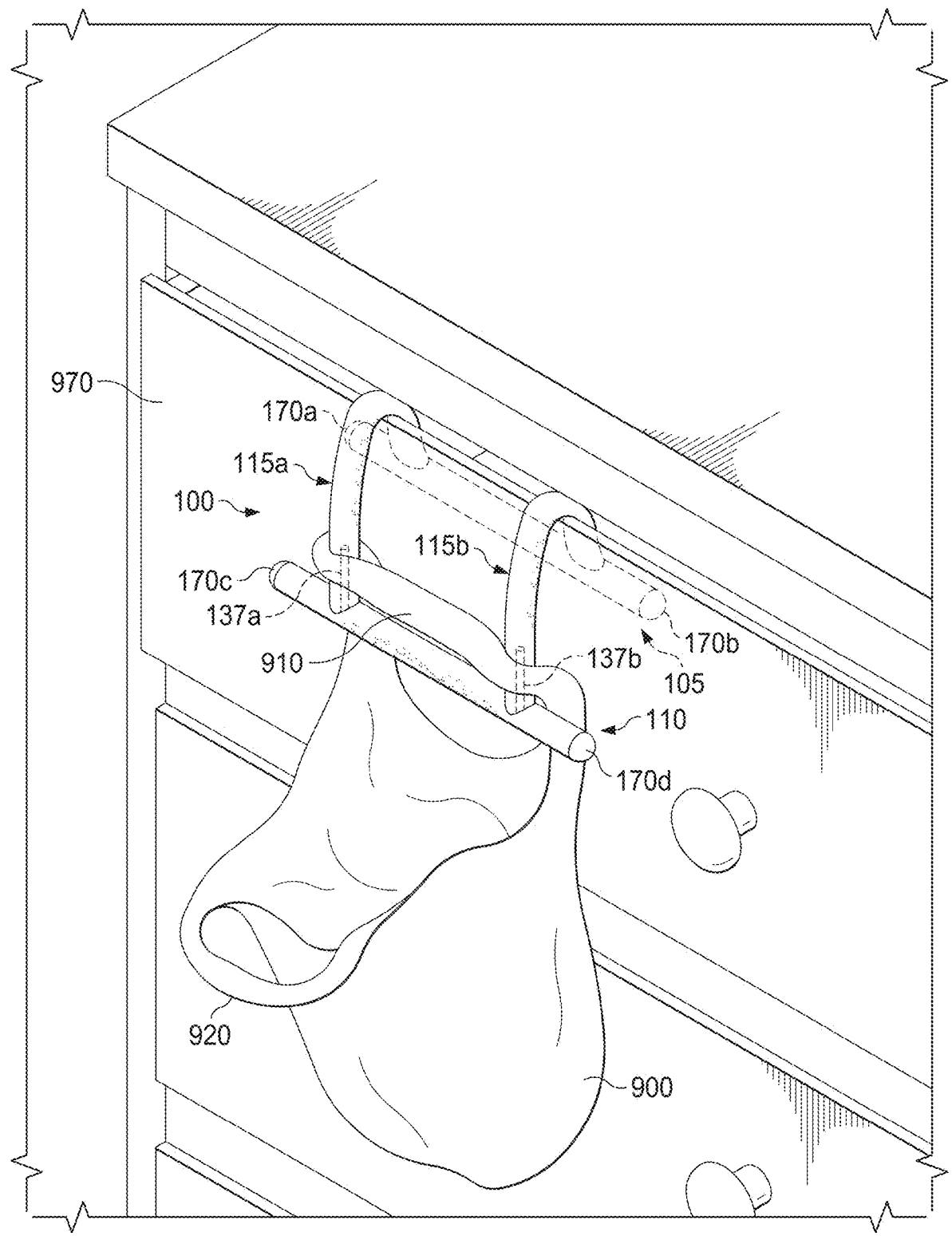
FIG. 2C shows a portable bag hanging apparatus in an exemplary environment of use with a drawer in accordance with one or more embodiments of the present invention.

Continuing, FIG. 2C shows a portable bag hanging apparatus 100 in an exemplary environment of use with a drawer 970 in accordance with one or more embodiments of the present invention. In certain applications, catch end 105 may be disposed in the interior of a drawer such that drawer face 970 closes on first cylindrical connector 115*a* and second cylindrical connector 115*b*. Because first cylindrical connector 115*a* and second cylindrical connector 115*b* are soft, crushable, and collapsible, the closure of drawer face 970 creates an interference fit retaining portable bag hanging apparatus 100 in place. However, should portable bag hanging apparatus 100 move under load, catch end 105 prevents portable bag hanging apparatus 100 from further movement, thereby retaining it in place. Disposable, recyclable, or biodegradable grocery style bag 900 includes a first handle 910 and a second handle 920. Either handle 910 or 920 (first handle 910 shown) may be wrapped around the points of attachment formed by first mounting post 137*a* and the first distal end (e.g., 170*c*) of attachment end 110 that extends beyond first mounting post 137*a* and second mounting post 137*b* and the second distal end (e.g., 170*d*) of attachment end 110 that extends beyond second mounting post 137*b*, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137*a* and second mounting post 137*b* may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 100 are composed of soft material, portable bag hanging apparatus 100 is quiet when it comes into contact with other objects.

Figure 2D:
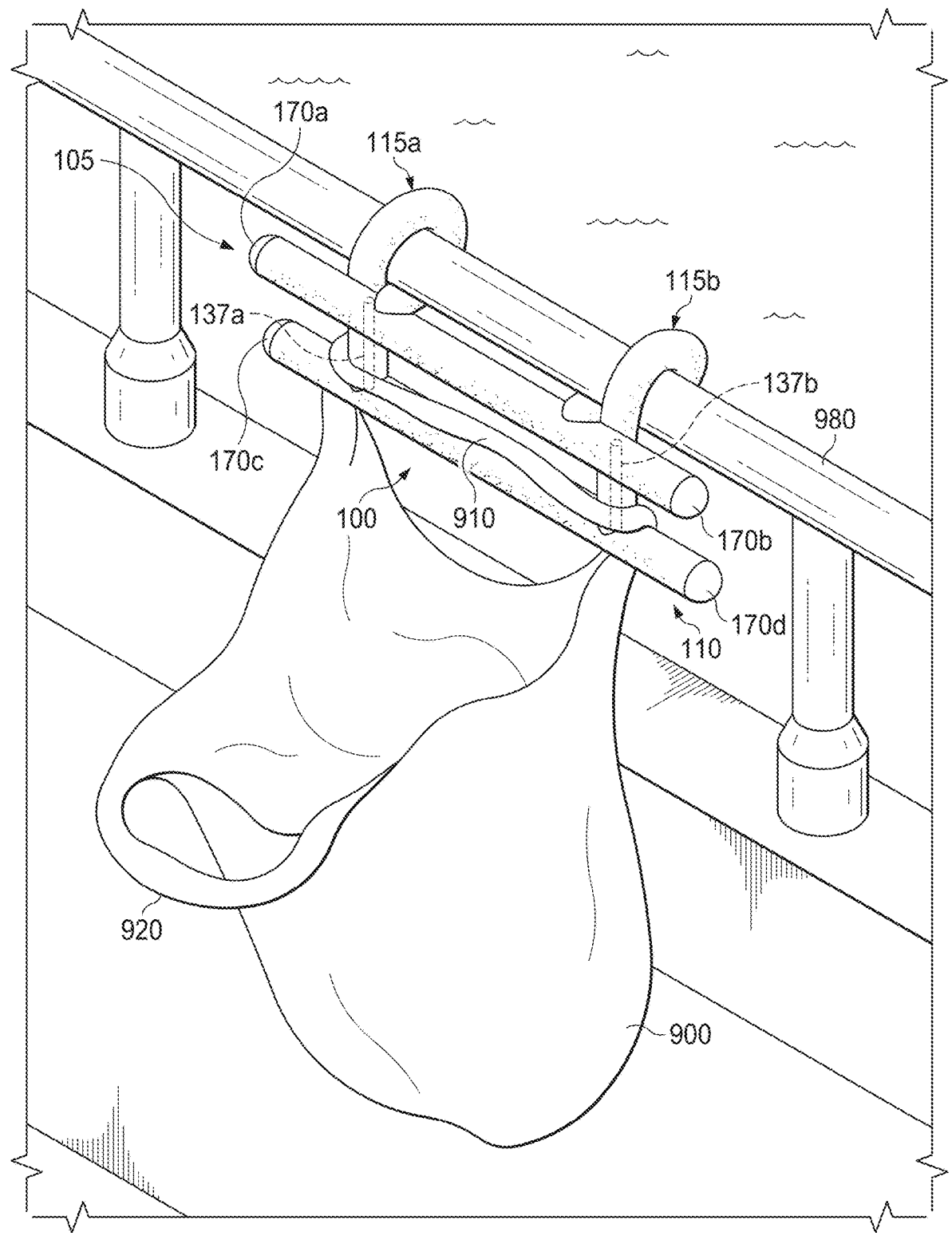
FIG. 2D shows a portable bag hanging apparatus in an exemplary environment of use with a marine rail in accordance with one or more embodiments of the present invention.

Continuing, FIG. 2D shows a portable bag hanging apparatus 100 in an exemplary environment of use with marine rail 980 in accordance with one or more embodiments of the present invention. Portable bag hanging apparatus 100 may be wrapped around a marine 980 or other rail as shown, with catch end 105 threaded in the gap between first cylindrical connector 115*a* and second cylindrical connector 115*b* to secure portable bag hanging apparatus 100 in place. Disposable, recyclable, or biodegradable grocery style bag 900 includes a first handle 910 and a second handle 920. Either handle 910 or 920 (first handle 910 shown) may be wrapped around the points of attachment formed by first mounting post 137*a* and the first distal end (e.g., 170*c*) of attachment end 110 that extends beyond first mounting post 137*a* and second mounting post 137*b* and the second distal end (e.g., 170*d*) of attachment end 110 that extends beyond second mounting post 137*b*, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137*a* and second mounting post 137*b* may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 100 are composed of soft material, portable bag hanging apparatus 100 is quiet when it comes into contact with other objects.

Figure 2E:
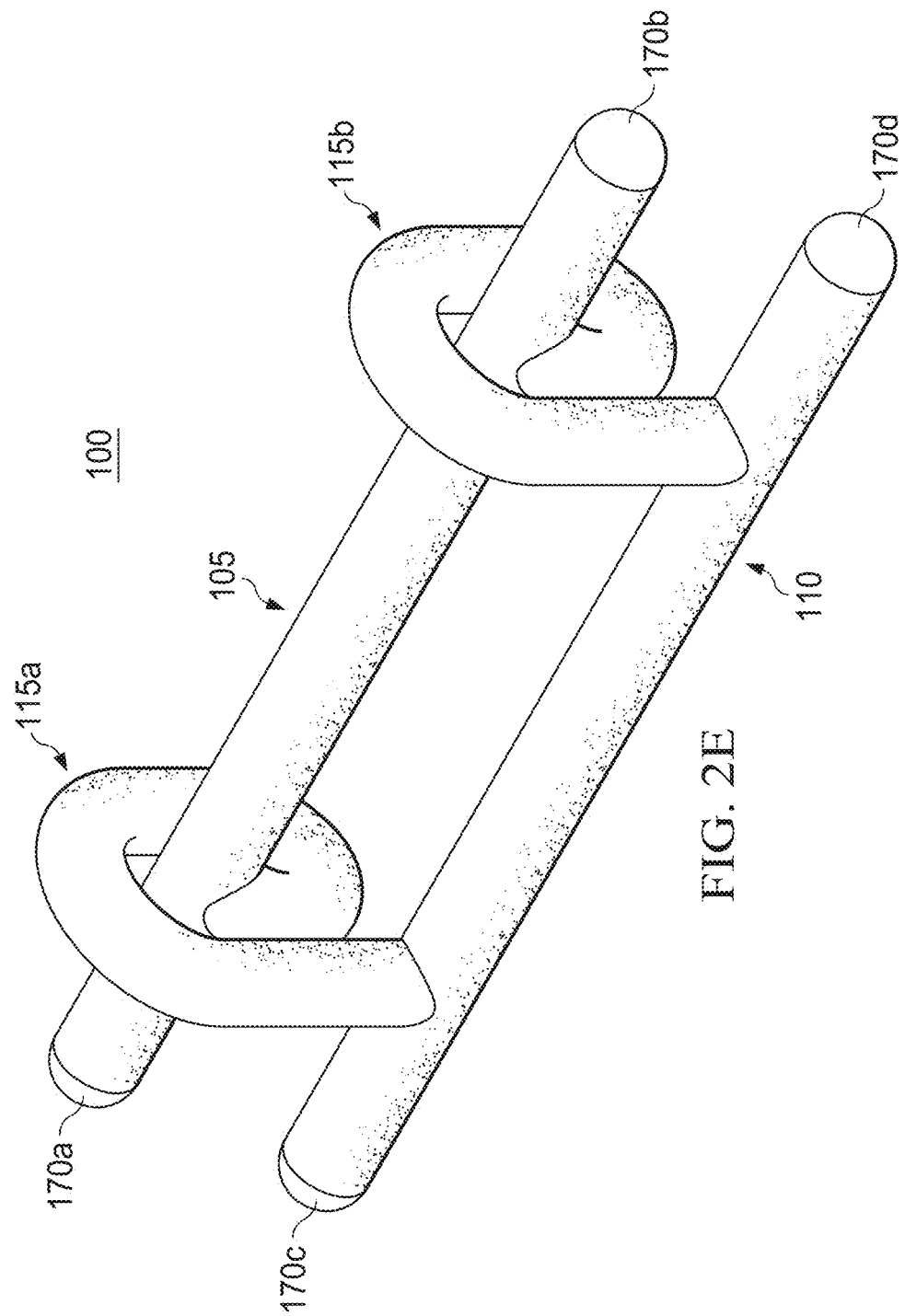
FIG. 2E shows a portable bag hanging apparatus folded for storage in accordance with one or more embodiments of the present invention.

Continuing, FIG. 2E shows portable bag hanging apparatus 100 folded for storage in accordance with one or more embodiments of the present invention. Because first cylindrical connector 115*a* and second cylindrical connector 115*b* are soft, crushable, and collapsible, portable bag hanging apparatus 100 may be folded up for easy storage and transport, without risk of damaging it during travel. The small and foldable nature of the portable bag hanging apparatus substantially reduces the footprint when not in use and makes it very easy to travel with and use in a diversity of applications.

Figure 3A:
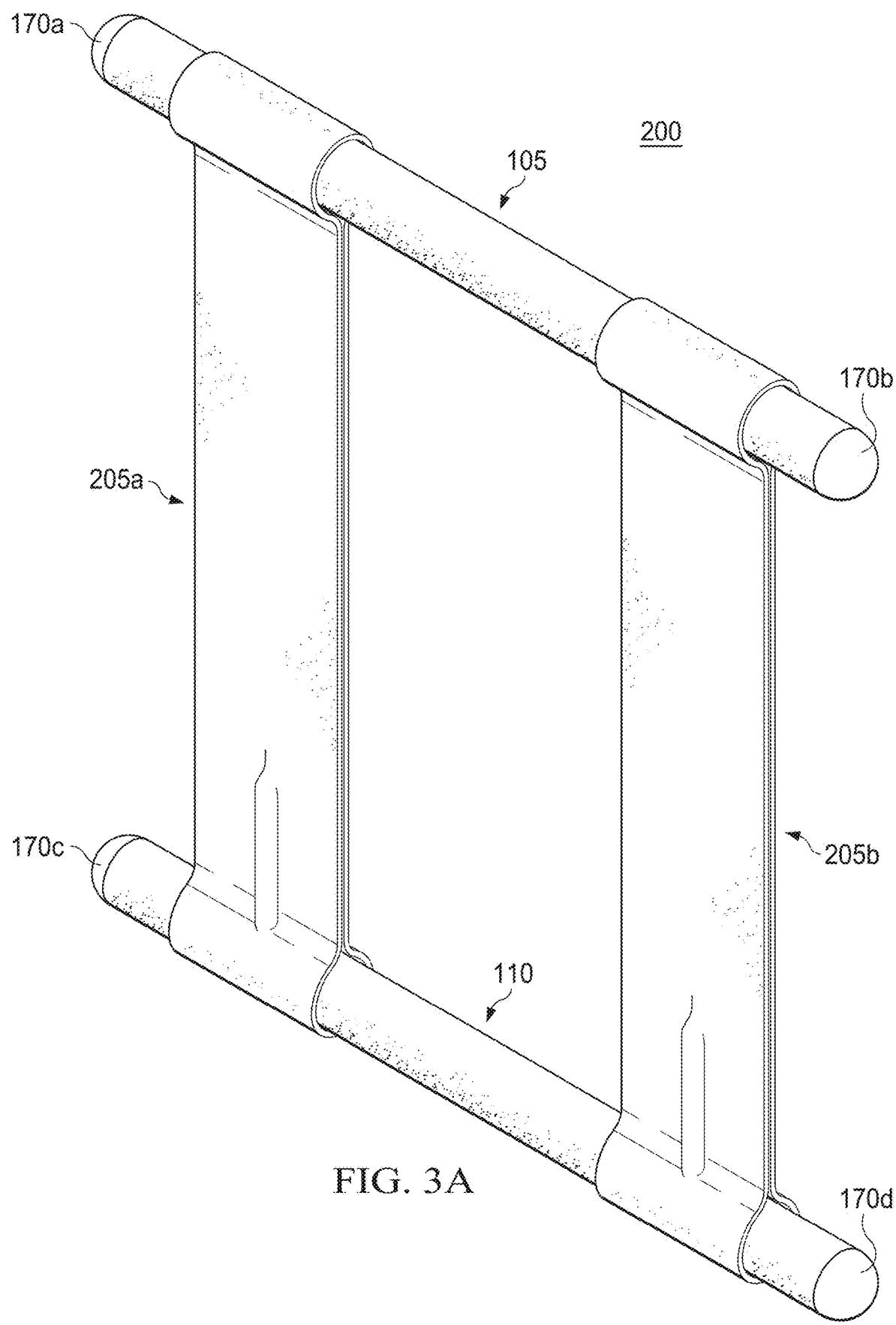
FIG. 3A shows a top-facing perspective view of portable bag hanging apparatus in accordance with one or more embodiments of the present invention.

FIG. 3A shows a top-facing perspective view of portable bag hanging apparatus 200 in accordance with one or more embodiments of the present invention. Portable bag hanging apparatus 200 may include a catch end 105 that serves as a physical catch to retain portable bag hanging apparatus in place when in operative use (e.g., FIGS. 4A-4D) and an attachment end 110 that serves as a platform of attachment for bags (e.g., FIG. 4A-4D), garments, and other hanging items. Catch end 105 may be attached to attachment end 110 by a pair of soft, crushable, and collapsible fabric connectors 205a, 205b that are spaced apart from one another, but offset from the distal ends of catch end 105 and attachment end 110 as shown. In the context of the present invention, soft describes the texture and feel, crushable describes the materials ability to be compressed or deformed under pressure without breaking and capable of returning to their original shape when the pressure is removed, and collapsible describes the ability to be folded or compacted into a smaller size for storage or transport.

In certain applications, first fabric connector 205a and second fabric connector 205b may be squeezed and secured in place between two objects, such as, for example, a closed glovebox (e.g., FIG. 4A), cabinet (e.g., FIG. 4B), or drawer (e.g., FIG. 4C), with an interference fit to secure it in place and, because catch end 105 is disposed on one side of the interference fit, catch end 105 provides additional retention should apparatus 200 move while traveling or under load. In other applications, first fabric connector 205a and second fabric connector 205b may be wedged between two objects with something less than an interference fit, relying instead upon the geometry of catch end 105 to catch on an object that prevents apparatus 200 from moving, thereby securing it in place. In still other applications, portable bag hanging apparatus 200 may be wrapped around a bar (e.g., FIG. 4D) and secured in place by threading catch end 105 in the gap between first fabric connector 205a and second fabric connector 205. For aesthetic appeal, optional end caps 170a and 170b may be removably disposed, or integrally formed, on opposing distal ends of catch end 105 and optional end caps 170c and 170d may be removably disposed, or integrally formed, on opposing distal ends of attachment end 110.

Figure 3B:
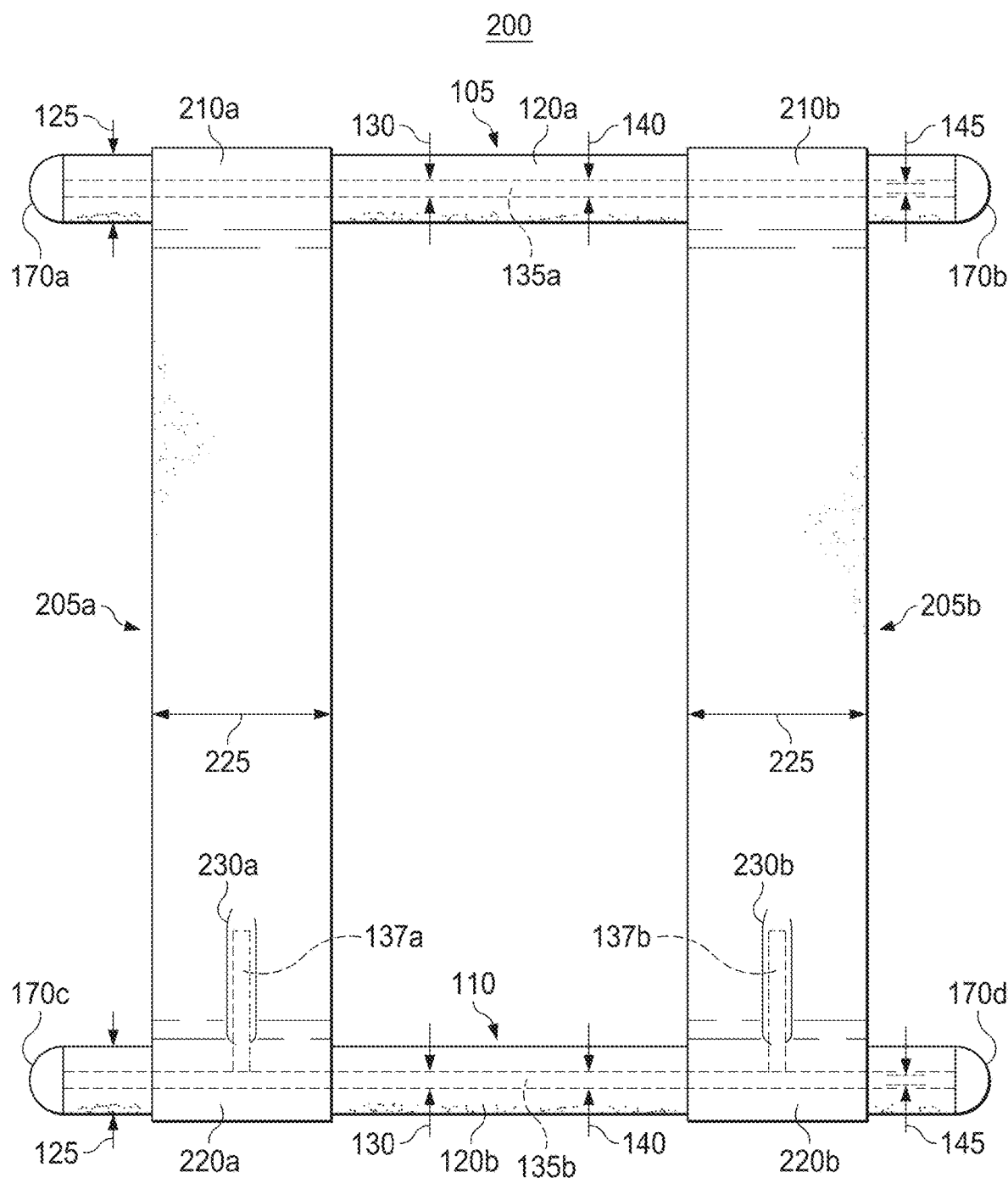
FIG. 3B shows a front elevation view of a portable bag hanging apparatus in accordance with one or more embodiments of the present invention.

Continuing, FIG. 3B shows a front elevation view of portable bag hanging apparatus 200 in accordance with one or more embodiments of the present invention. Catch end 105 may include a first support member 135a disposed in a first soft outer member 120a having a cylindrical shape. Similarly, attachment end 110 may include a second support member 135b disposed in a second soft outer member 120b having a cylindrical shape. In certain embodiments, intended for use with disposable, recyclable, or biodegradable grocery style bags, first soft outer member 120a and second soft outer member 120b may each have a length in a range between 8 inches and 12 inches. In other embodiments, first soft outer member 120a and second soft outer member 120b may each have a length in a range between 4 inches and 16 inches. In still other embodiments first soft outer member 120a and second soft outer member 120b may each have a length in a range between 2 inches and 20 inches. One of ordinary skill in the art, having the benefit of this disclosure, will recognize that the length of the soft outer members 120a, 120b may vary based on an application or design in accordance with one or more embodiments of the present invention. The first end of first fabric connector 205a may attach at offset 210a to a first distal end of catch end 105 and the second end of first fabric connector 205a may attach at offset 220a to a first distal end of attachment end 110. Similarly, the first end of second fabric connector 205b may attach at offset 210b to a second distal end of catch end 105 and a second end of second fabric connector 205b may attach at offset 220b to a second distal end of attachment end 110. In certain embodiments, offsets 210a, 210b, 220a, 220b may be in a range between 1 inch and 3 inches. In other embodiments, the offsets 210a, 210b, 220a, 220b may be in a range between 1 inch and 6 inches. In still other embodiments, the offsets 210a, 210b, 220a, 220b may be in a range between 1 inch and 9 inches. One of ordinary skill in the art, having the benefit of this disclosure, will recognize that the offsets 210a, 210b, 220a, 220b may vary based on an application or design in accordance with one or more embodiments of the present invention.

In certain embodiments, first fabric connector 205a and second fabric connector 205b may each have a length in a range between 8 inches and 12 inches. In other embodiments, first fabric connector 205a and second fabric connector 205b may each have a length in a range between 4 inches and 16 inches. In still other embodiments, first fabric connector 205a and second fabric connector 205b may each have a length in a range between 2 inches and 20 inches. One of ordinary skill in the art, having the benefit of this disclosure, will recognize that the length of the fabric connectors 205a, 205b may vary based on an application or design in accordance with one or more embodiments of the present invention. A first mounting post 137a may be attached orthogonally to second support member 135b and at least partially disposed within first fabric connector 205a as shown. A second mounting post 137b may be attached orthogonally to second support member 135b and at least partially disposed within second fabric connector 205b as shown. The portion of attachment end 110 in between first mounting post 137a and the first distal end (e.g., 170c) of attachment end 110, in conjunction with the rigidity of first mounting post 137a, form a first point of attachment as described in more detail herein. Similarly, the portion of attachment end 110 in between second mounting post 137b and the second distal end (e.g., 170d) of attachment end 110, in conjunction with the rigidity of second mounting post 137b, form a second point of attachment as described in more detail herein.

Figure 3C:
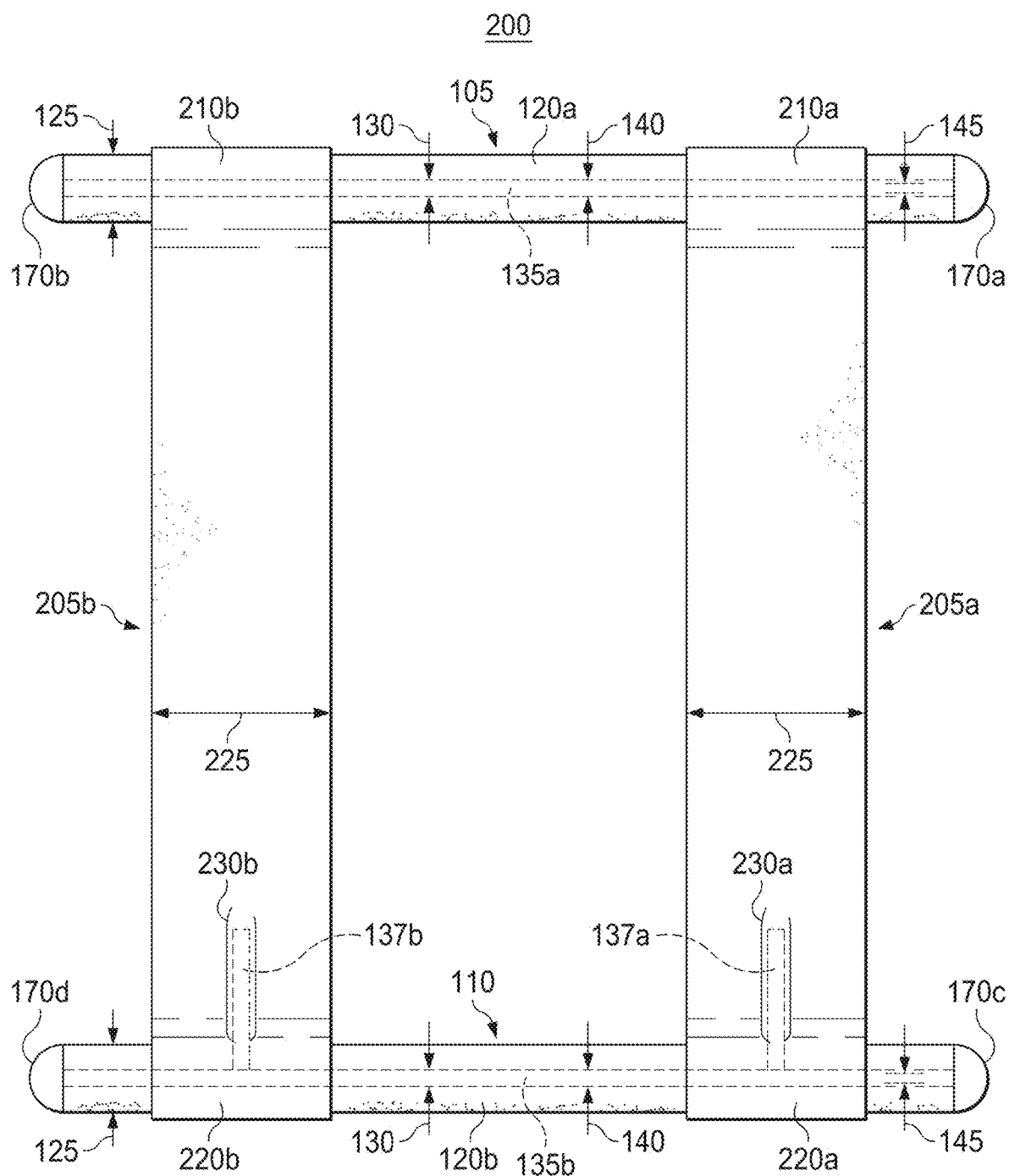
FIG. 3C shows a rear elevation view of a portable bag hanging apparatus in accordance with one or more embodiments of the present invention.

Continuing, FIG. 3C shows a rear elevation view of portable bag hanging apparatus 200 in accordance with one or more embodiments of the present invention. In certain embodiments, intended for use with disposable, recyclable, or biodegradable grocery style bags, first soft outer member 120a of catch end 105 may have an outer diameter 125 in a range between ½ inch and 1 inch. In other embodiments, first soft outer member 120a of catch end 105 may have an outer diameter 125 in a range between ⅜ inch and ⅝ inch. In still other embodiments, first soft outer member 120a of catch end 105 may have an outer diameter 125 in a range between ¼ inch and ⅝ inch. One of ordinary skill in the art, having the benefit of this disclosure, will recognize that the outer diameter 125 of first soft outer member 120a of catch end 105 may vary based on an application or design in accordance with one or more embodiments of the present invention. In certain embodiments, first soft outer member 120a of catch end 105 may have an inner diameter cutout 130 in a range between ⁵⁄₁₆ inch and ½ inch, configured to receive first support member 135a. In other embodiments, first soft outer member 120a of catch end 105 may have an inner diameter cutout 130 in a range between ¼ inch and ½ inch. In still other embodiments, first soft outer member 120a of catch end 105 may have an inner diameter cutout 130 in a range between ⅛ inch and ¾ inch. One of ordinary skill in the art, having the benefit of this disclosure, will recognize that the inner diameter cutout 130 of first soft outer member 120a of catch end 105 may vary based on an application or design in accordance with one or more embodiments of the present invention.

First support member 135a may have an outer diameter 140 matching or slightly larger than that of the inner diameter cutout 130 of first soft outer member 120a of catch end 105, sufficient to form an interference fit when inserted into first soft outer member 120a. In certain embodiments, first support member 135a may have an outer diameter 140 in a range between 5/16 inch and 1/2 inch. In other embodiments, first support member 135a may have an outer diameter 140 in a range between 1/4 inch and 1/2 inch. In still other embodiments, first support member 135a may have an outer diameter 140 in a range between 1/8 inch and 3/4 inch. One of ordinary skill in the art, having the benefit of this disclosure, will recognize that the outer diameter 140 of first support member 135a may vary based on an application or design in accordance with one or more embodiments of the present invention. First support member 135a may have a material composition that is flexible, semi-rigid, or rigid, to provide the requisite structure, for a given application or design. For example, first support member 135a may be composed of carbon fiber, fiberglass, wood, plastic, plastic composites, composite materials, metals, or metal alloys, depending on an application or design. First support member 135a may optionally have a centerline cutout 145 to reduce weight and material cost.

In certain embodiments, intended for use with disposable, recyclable, or biodegradable grocery style bags, second soft outer member 120b of attachment end 110 may have an outer diameter 125 in a range between 1/2 inch and 1 inch. In other embodiments, second soft outer member 120b of attachment end 110 may have an outer diameter 125 in a range between 3/8 inch and 5/4 inch. In still other embodiments, second soft outer member 120b of attachment end 110 may have an outer diameter 125 in a range between 1/4 inch and 5/4 inch. One of ordinary skill in the art, having the benefit of this disclosure, will recognize that the outer diameter 125 of second soft outer member 120b of attachment end 110 may vary based on an application or design in accordance with one or more embodiments of the present invention. In certain embodiments, second soft outer member 120b of attachment end 110 may have an inner diameter cutout 130 in a range between 5/16 inch and 1/2 inch, configured to receive second support member 135b. In other embodiments, second soft outer member 120b of attachment end 110 may have an inner diameter cutout 130 in a range between 1/4 inch and 1/2 inch. In still other embodiments, second soft outer member 120b of attachment end 110 may have an inner diameter cutout 130 in a range between 1/8 inch and 3/4 inch. One of ordinary skill in the art, having the benefit of this disclosure, will recognize that the inner diameter cutout 130 of second soft outer member 120b of attachment end 110 may vary based on an application or design in accordance with one or more embodiments of the present invention.

Second support member 135b may have an outer diameter 140 matching or slightly larger than that of the inner diameter cutout 130 of second support member 135b of attachment end 110, sufficient to form an interference fit when inserted into second support member 135b. In certain embodiments, second support member 135b may have an outer diameter 140 in a range between 5/16 inch and 1/2 inch. In other embodiments, second support member 135b may have an outer diameter 140 in a range between 1/4 inch and 1/2 inch. In still other embodiments, second support member 135b may have an outer diameter 140 in a range between 1/8 inch and 3/4 inch. One of ordinary skill in the art, having the benefit of this disclosure, will recognize that the outer diameter 140 of second support member 135b may vary based on an application or design in accordance with one or more embodiments of the present invention. Second support member 135b may have a material composition that is flexible, semi-rigid, or rigid, to provide the requisite structure, for a given application or design. For example, second support member 135b may be composed of carbon fiber, fiberglass, wood, plastic, plastic composites, composite materials, metals, or metal alloys, depending on an application or design Second support member 135b may optionally have a centerline cutout 145 to reduce weight and material cost.

Continuing, FIG. 3D shows a left elevation view of portable bag hanging apparatus 200 in accordance with one or more embodiments of the present invention. In certain embodiments, first fabric connector 205a may have a thickness in a range between 1/16 inch and 3/16 inch. In other embodiments, first fabric connector 205a may have a thickness in a range between 1/32 inch and 5/16 inch. In still other embodiments, first fabric connector 205a may have a thickness in a range between 1/64 inch and 7/16 inch. One of ordinary skill in the art, having the benefit of this disclosure, will recognize that the thickness of first fabric connector 205a may vary based on an application or design in accordance with one or more embodiments of the present invention. Similarly, in certain embodiments, second fabric connector 205b may have a thickness in a range between 1/16 inch and 3/16 inch. In other embodiments, second fabric connector 205b may have a thickness in a range between 1/32 inch and 5/16 inch. In still other embodiments, second fabric connector 205b may have a thickness in a range between 1/64 inch and 7/16 inch. One of ordinary skill in the art, having the benefit of this disclosure, will recognize that the thickness of second fabric connector 205b may vary based on an application or design in accordance with one or more embodiments of the present invention.

Figure 3F:
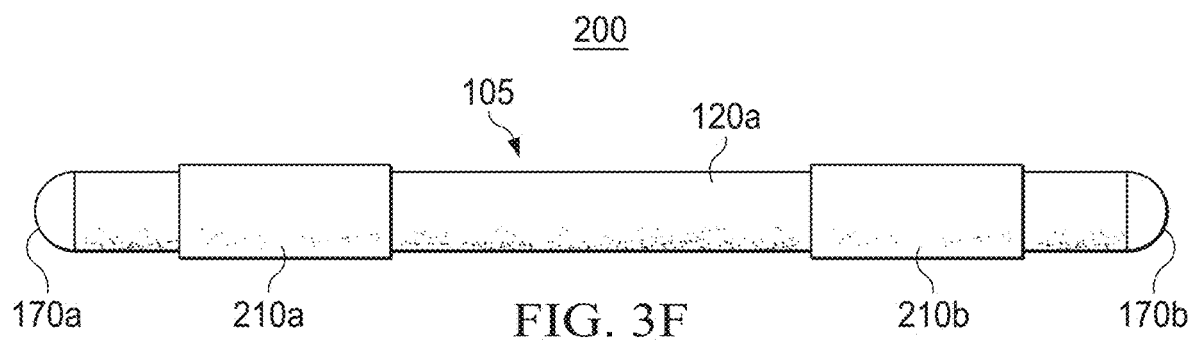
FIG. 3F shows a top plan view of a portable bag hanging apparatus in accordance with one or more embodiments of the present invention.
Figure 3G:
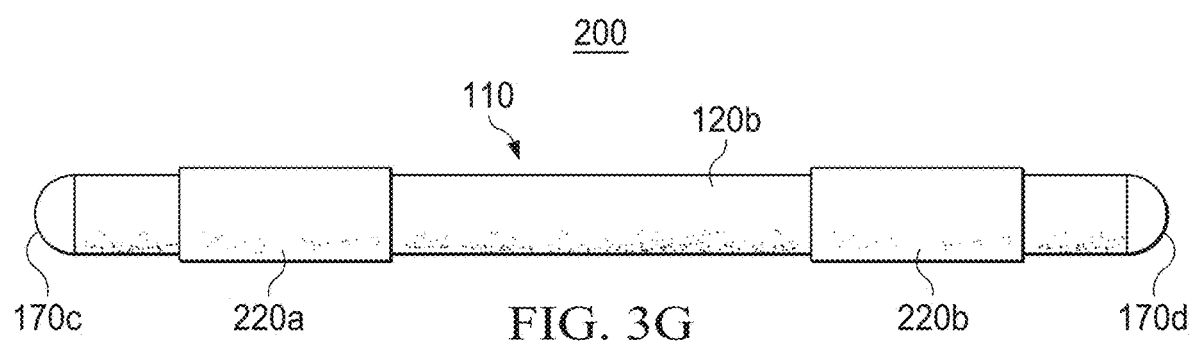
FIG. 3G shows a bottom plan view of a portable bag hanging apparatus in accordance with one or more embodiments of the present invention.

In certain embodiments, first mounting post 137a and second mounting post 137b may each have a length in a range between 1 inch and 4 inches and an outer diameter 165 in a range between 1/8 inch and 1 inch. One of ordinary skill in the art, having the benefit of this disclosure, will recognize that the length and outer diameter 165 of the first and second mounting posts 137a, 137b may vary based on an application or design. Continuing, FIG. 3E shows a right elevation view of portable bag hanging apparatus 200 in accordance with one or more embodiments of the present invention. Continuing, FIG. 3F shows a top plan view of portable bag hanging apparatus 200 in accordance with one or more embodiments of the present invention. Continuing, FIG. 3G shows a bottom plan view of portable bag hanging apparatus 200 in accordance with one or more embodiments of the present invention.

Figure 3H:
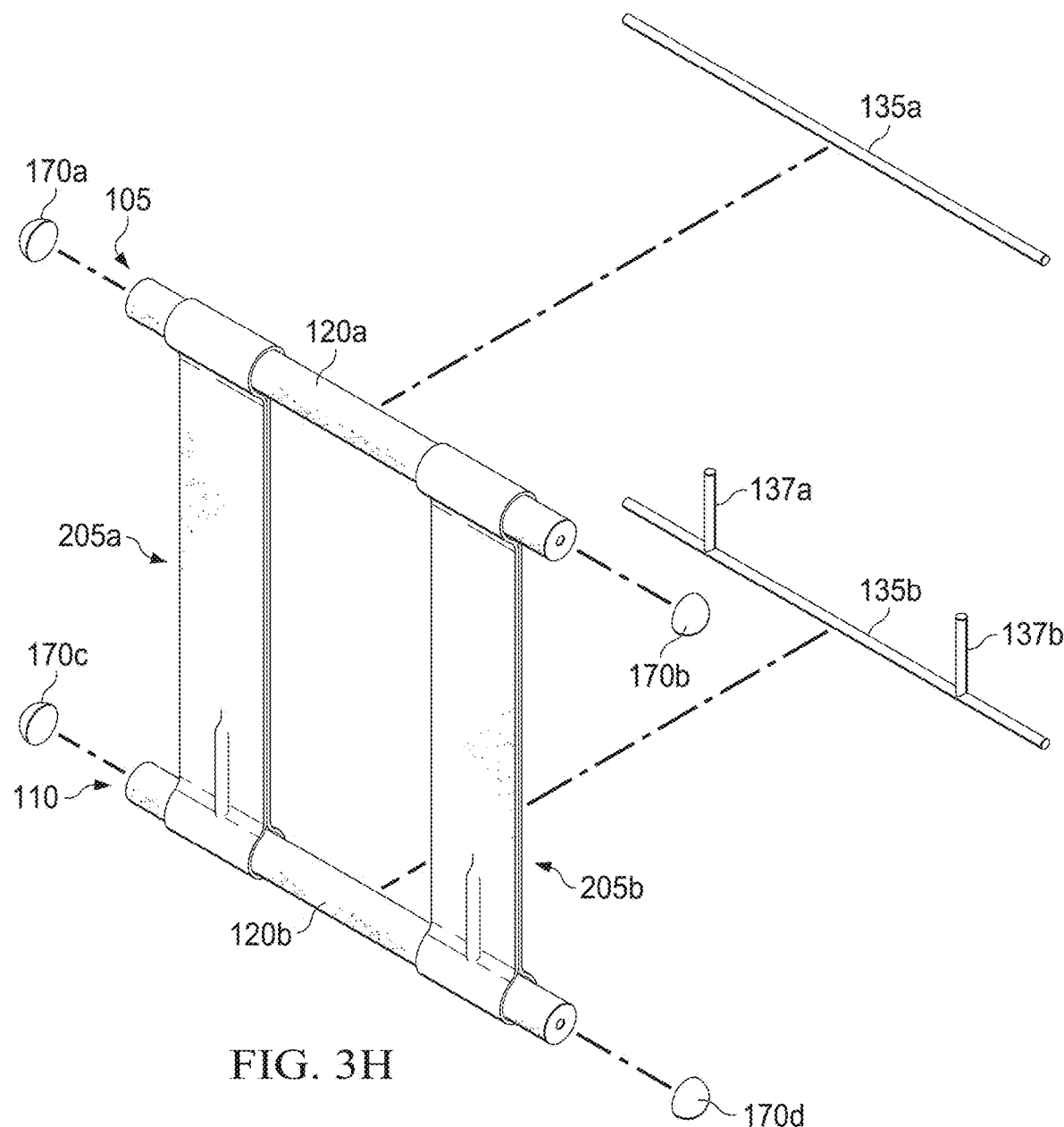
FIG. 3H shows an exploded view of a portable bag hanging apparatus in accordance with one or more embodiments of the present invention.

Continuing, FIG. 3H shows an exploded view of portable bag hanging apparatus 200 in accordance with one or more embodiments of the present invention. First support member 135a may be inserted into the inner diameter (e.g., 130 of FIG. 1B) of first soft outer member 120a of catch end 105 and secured in place with an interference fit. Second support member 135b may be inserted into the inner diameter (e.g., 130 of FIG. 1B) of second soft outer member 120b of attachment end 110 and secured in place with an interference fit. Optional end caps 170a and 170b may be removably disposed, or integrally formed, on opposing distal ends of catch end 105 and optional end caps 170c and 170d may be removably disposed, or integrally formed, on opposing distal ends of attachment end 110.

Figure 4A:
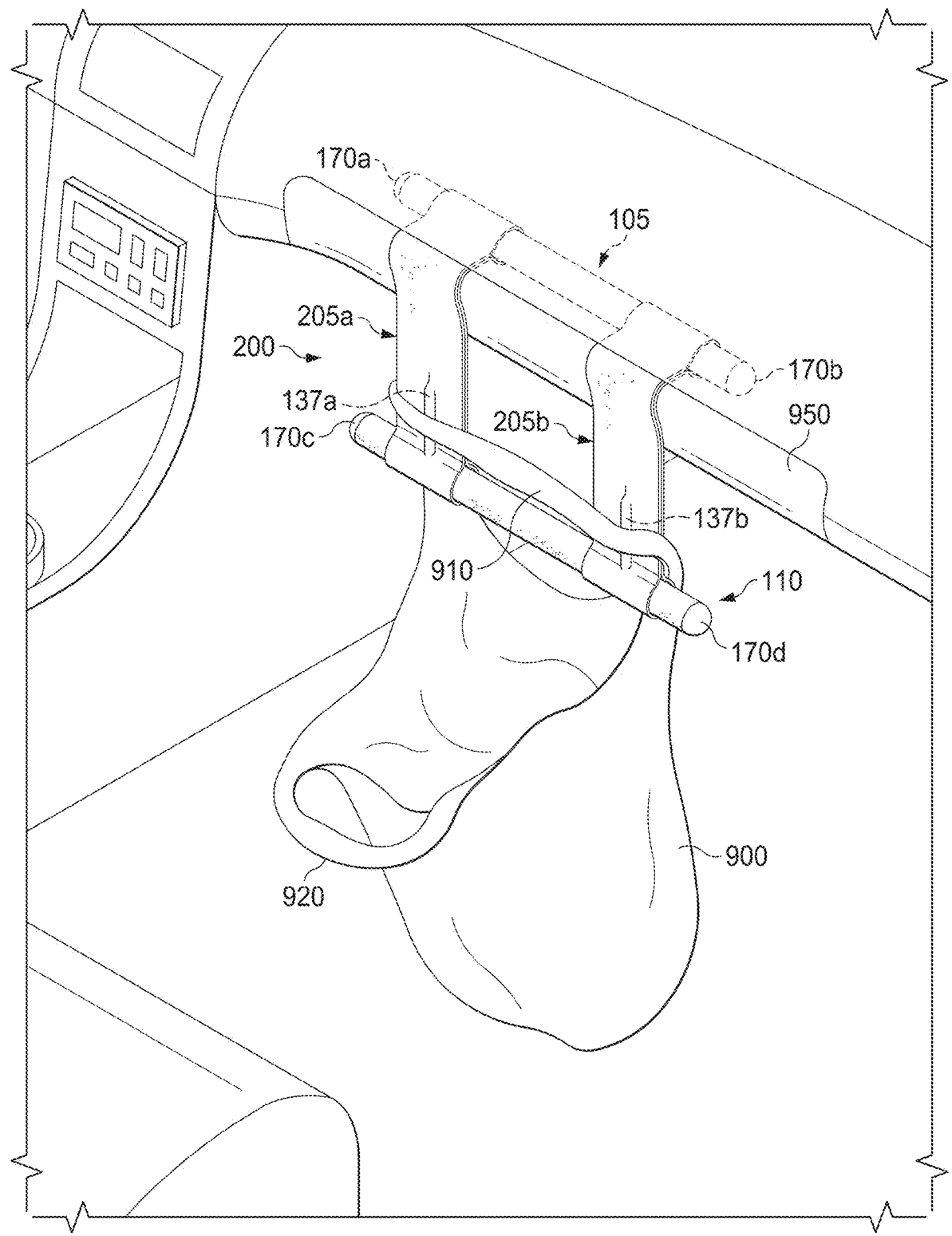
FIG. 4A shows a portable bag hanging apparatus in an exemplary environment of use with a glovebox in accordance with one or more embodiments of the present invention.

FIG. 4A shows a portable bag hanging apparatus 200 in an exemplary environment of use with a glovebox 950 environment of use in accordance with one or more embodiments of the present invention. In certain applications, catch end 105 may be disposed in the interior of an automotive glovebox such that glovebox door 950 closes on first fabric connector 205a and second fabric connector 205b. Because first fabric connector 205a and second fabric connector 205b are soft, crushable, and collapsible, the closure of glovebox door 950 creates an interference fit retaining portable bag hanging apparatus 200 in place. However, should portable bag hanging apparatus 200 move due to travel or under load, catch end 105 prevents portable bag hanging apparatus 200 from further movement, thereby retaining it in place. Disposable, recyclable, or biodegradable grocery style bag 900 includes a first handle 910 and a second handle 920. Either handle 910 or 920 (first handle 910 shown) may be wrapped around the points of attachment formed by first mounting post 137a and the first distal end (e.g., 170c) of attachment end 110 that extends beyond first mounting post 137a and second mounting post 137b and the second distal end (e.g., 170d) of attachment end 110 that extends beyond second mounting post 137b, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137a and second mounting post 137b may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 200 are composed of soft material, portable bag hanging apparatus 200 is quiet when it comes into contact with other objects.

Figure 4B:
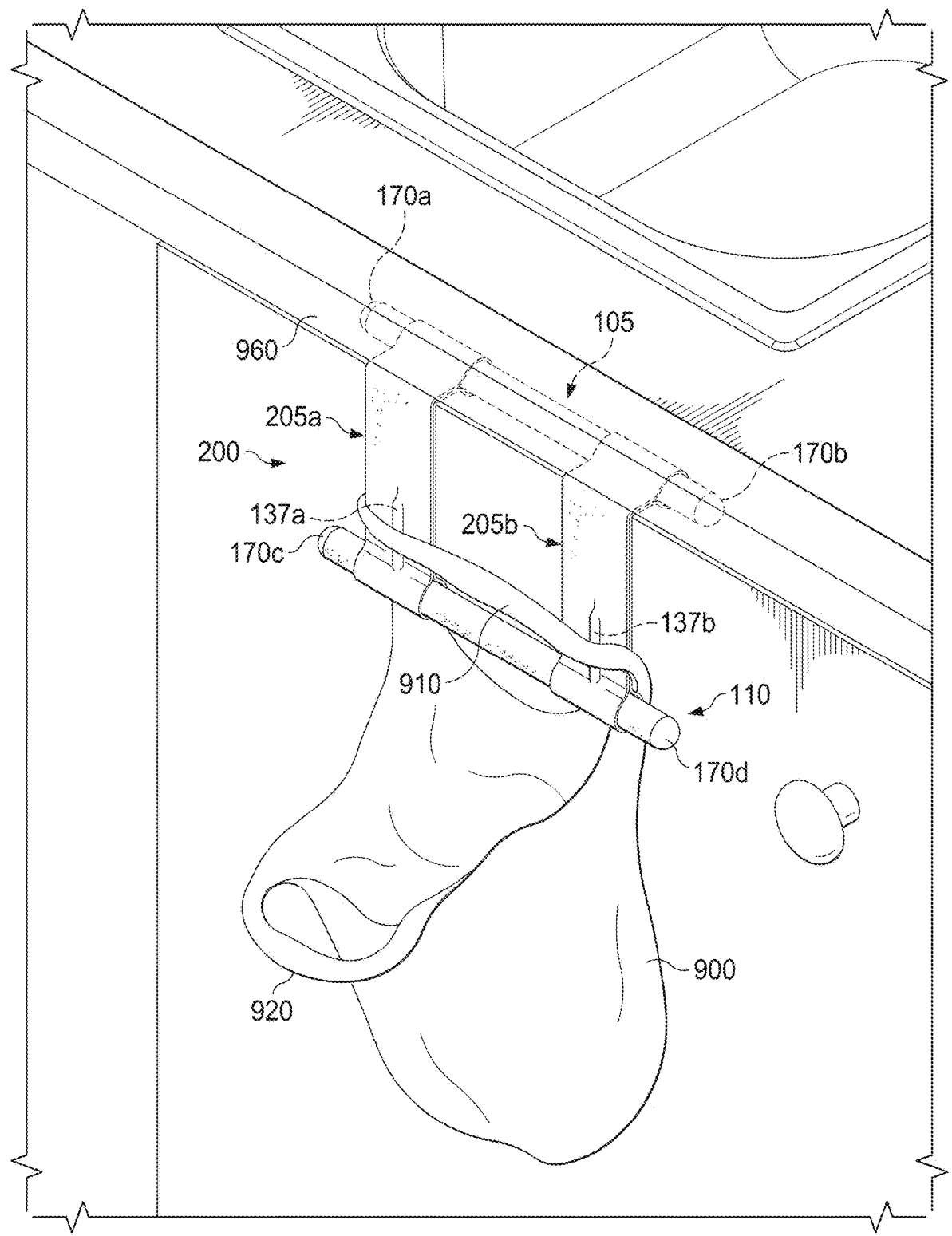
FIG. 4B shows a portable bag hanging apparatus in an exemplary environment of use with cabinet door in accordance with one or more embodiments of the present invention.

Continuing, FIG. 4B shows a portable bag hanging apparatus 200 in an exemplary environment of use with a cabinet door 960 in accordance with one or more embodiments of the present invention. In certain applications, catch end 105 may be disposed in the interior of a cabinet such that cabinet door 960 closes on first fabric connector 205a and second fabric connector 205b. Because first fabric connector 205a and second fabric connector 205b are soft, crushable, and collapsible, the closure of cabinet door 960 creates an interference fit retaining portable bag hanging apparatus 200 in place. However, should portable bag hanging apparatus 200 move under load, catch end 105 prevents portable bag hanging apparatus 200 from further movement, thereby retaining it in place. Disposable, recyclable, or biodegradable grocery style bag 900 includes a first handle 910 and a second handle 920. Either handle 910 or 920 (first handle 910 shown) may be wrapped around the points of attachment formed by first mounting post 137a and the first distal end (e.g., 170c) of attachment end 110 that extends beyond first mounting post 137a and second mounting post 137b and the second distal end (e.g., 170d) of attachment end 110 that extends beyond second mounting post 137b, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137a and second mounting post 137b may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 200 are composed of soft material, portable bag hanging apparatus 200 is quiet when it comes into contact with other objects.

Figure 4C:
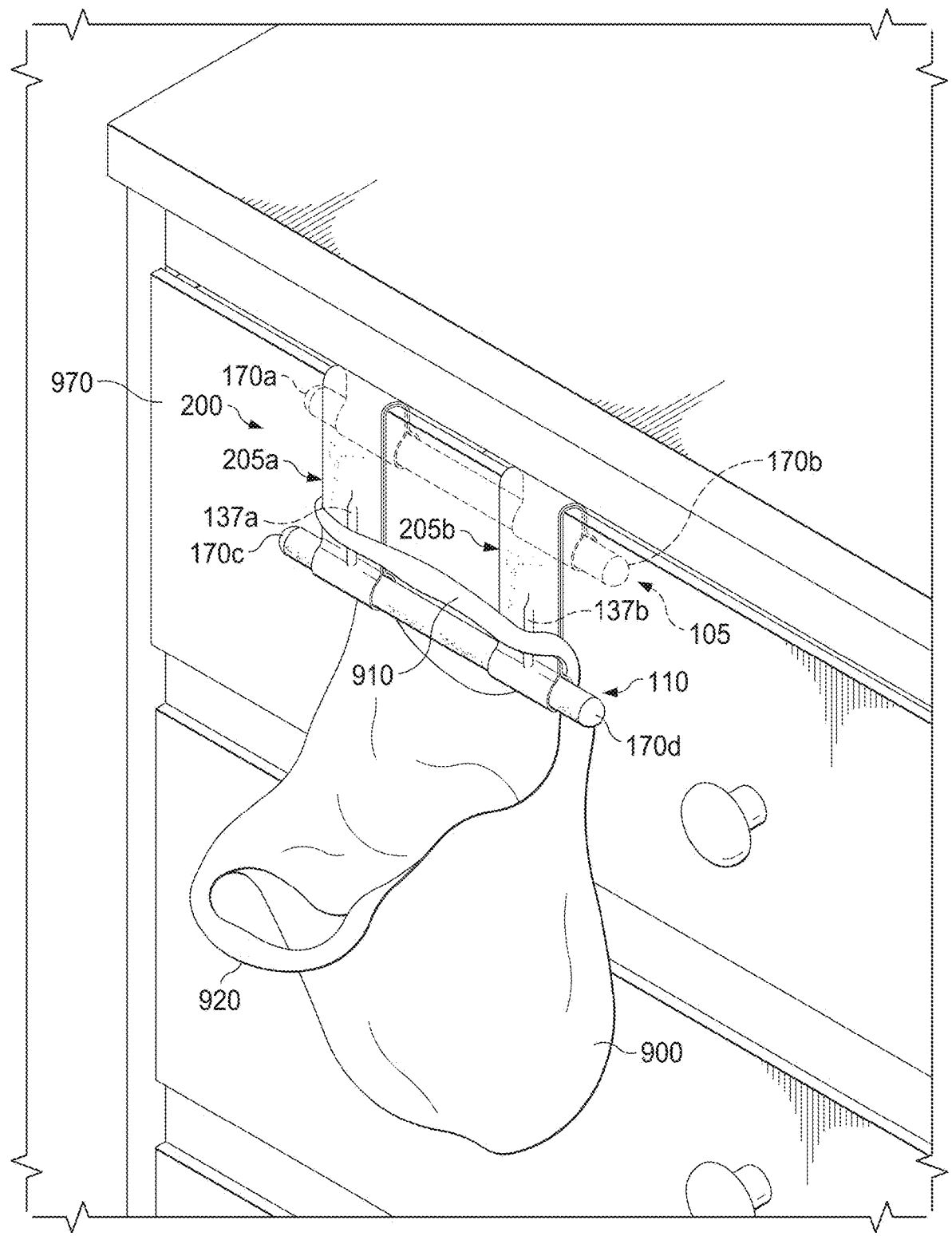
FIG. 4C shows a portable bag hanging apparatus in an exemplary environment of use with a drawer in accordance with one or more embodiments of the present invention.

Continuing, FIG. 4C shows a portable bag hanging apparatus 200 in an exemplary environment of use with a drawer 970 in accordance with one or more embodiments of the present invention. In certain applications, catch end 105 may be disposed in the interior of a drawer such that drawer face 970 closes on first fabric connector 205a and second fabric connector 205b. Because first fabric connector 205a and second fabric connector 205b are soft, crushable, and collapsible, the closure of drawer 970 face creates an interference fit retaining portable bag hanging apparatus 200 in place. However, should portable bag hanging apparatus 200 move under load, catch end 105 prevents portable bag hanging apparatus 200 from further movement, thereby retaining it in place. Disposable, recyclable, or biodegradable grocery style bag 900 includes a first handle 910 and a second handle 920. Either handle 910 or 920 (first handle 910 shown) may be wrapped around the points of attachment formed by first mounting post 137a and the first distal end (e.g., 170c) of attachment end 110 that extends beyond first mounting post 137a and second mounting post 137b and the second distal end (e.g., 170d) of attachment end 110 that extends beyond second mounting post 137b, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137a and second mounting post 137b may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 200 are composed of soft material, portable bag hanging apparatus 200 is quiet when it comes into contact with other objects.

Figure 4D:
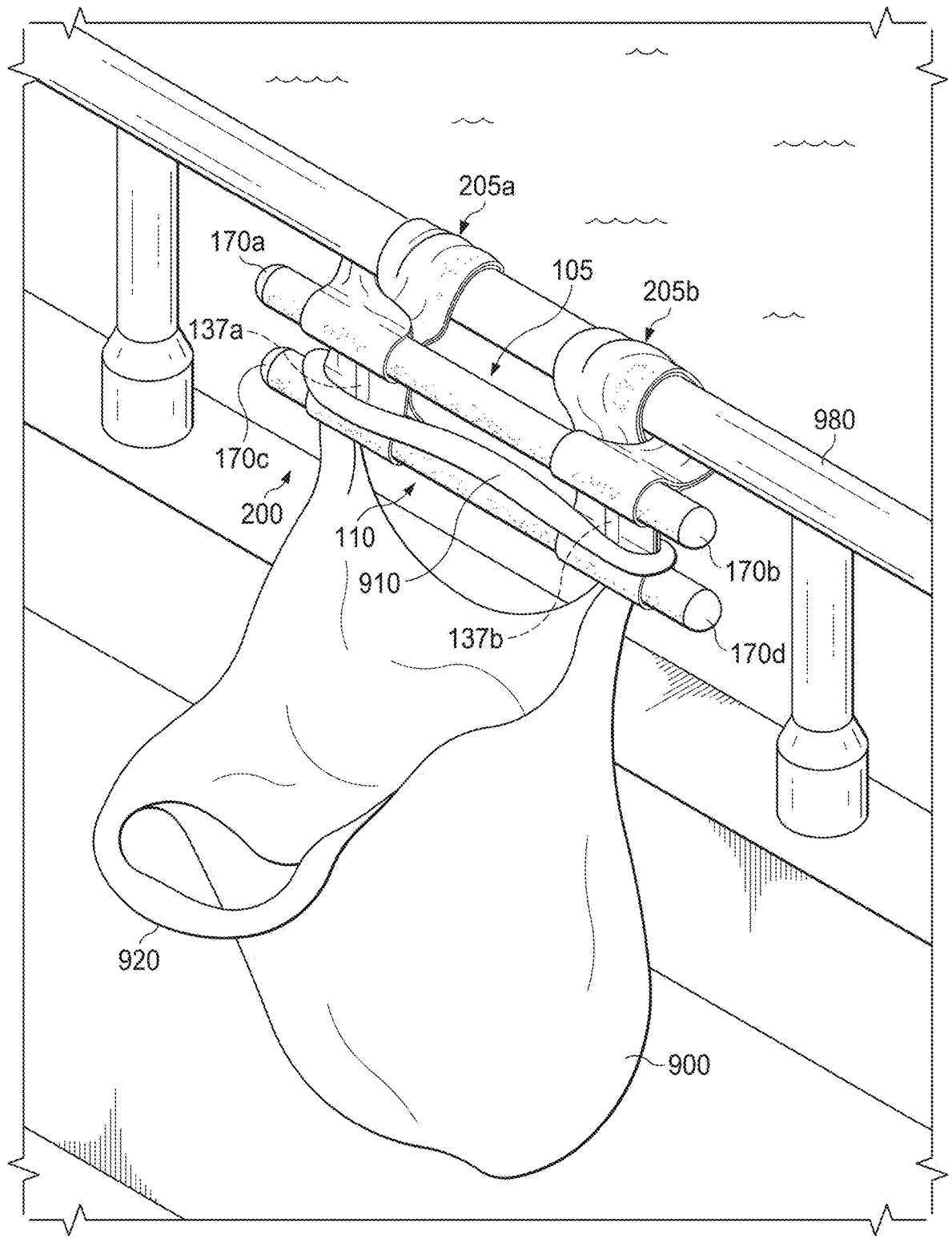
FIG. 4D shows a portable bag hanging apparatus in an exemplary environment of use with a marine rail in accordance with one or more embodiments of the present invention.

Continuing, FIG. 4D shows a portable bag hanging apparatus 200 in an exemplary environment of use with a marine rail 980 in accordance with one or more embodiments of the present invention. Portable bag hanging apparatus 200 may be wrapped around a marine 980 or other rail as shown, with catch end 105 threaded in between first fabric connector 205a and second fabric connector 205b to secure portable bag hanging apparatus 200 in place. Disposable, recyclable, or biodegradable grocery style bag 900 includes a first handle 910 and a second handle 920. Either handle 910 or 920 (first handle 910 shown) may be wrapped around the points of attachment formed by first mounting post 137a and the first distal end (e.g., 170c) of attachment end 110 that extends beyond first mounting post 137a and second mounting post 137b and the second distal end (e.g., 170d) of attachment end 110 that extends beyond second mounting post 137b, thereby holding disposable, recyclable, or biodegradable grocery style bag 900 in an open position. In certain applications intended for use with disposable, recyclable, or biodegradable grocery style bags 900, the length of attachment end 110 and the offset positions of first mounting post 137a and second mounting post 137b may be selected to ensure that the handle (e.g., 910 as shown or 920 not shown) of a standard disposable, recyclable, or biodegradable grocery style bag 900 must stretch to fit over the points of attachment, thereby securing the grocery style bag 900 in place and holding it open for operative use. Because all exposed portions of portable bag hanging apparatus 200 are composed of soft material, portable bag hanging apparatus 200 is quiet when it comes into contact with other objects.

Figure 4E:
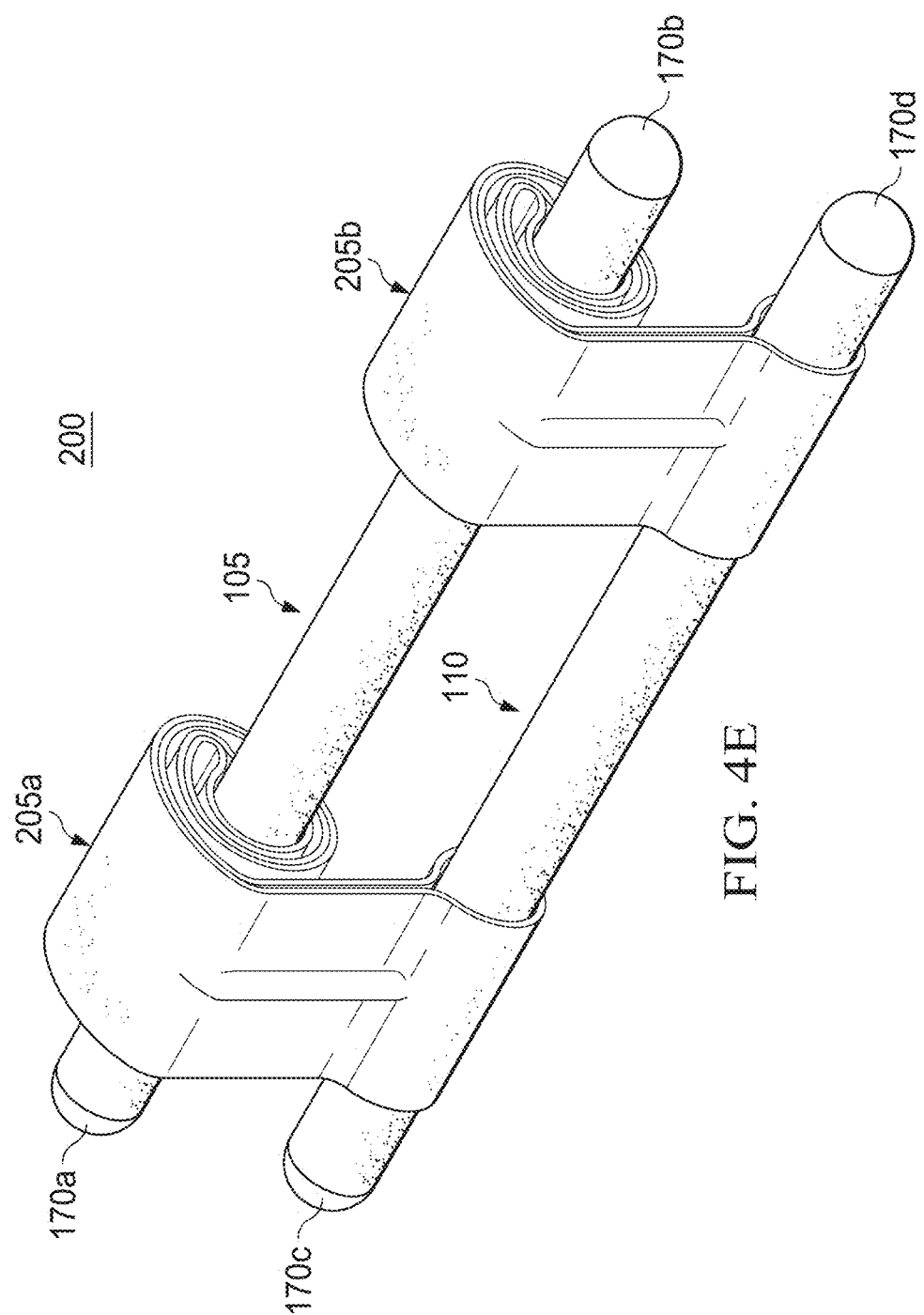
FIG. 4E shows a portable bag hanging apparatus folded for storage in accordance with one or more embodiments of the present invention.

Continuing, FIG. 4E shows a portable bag hanging apparatus 200 folded for storage in accordance with one or more embodiments of the present invention. Because first fabric connector 205a and second fabric connector 205b are soft, crushable, and collapsible, portable bag hanging apparatus 200 may be folded up for easy storage and transport, without risk of damaging it during travel. The small and foldable nature of the portable bag hanging apparatus substantially reduces the footprint when not in use and makes it very easy to travel with and use in a diversity of applications.

Advantages of one or more embodiments of the present invention may include one or more of the following:

In one or more embodiments of the present invention, a portable bag hanging apparatus may more easily and securely attach to a wider variety of objects and enables more diverse use cases. In certain applications, the soft, crushable, and collapsible connectors may be secured between two objects with an interference fit while the catch end provides additional retention should it move. In other applications, the soft, crushable, and collapsible connectors may be wedged between two objects with something less than an interference fit, relying instead upon the catch end to catch between the two objects thereby securing its position in place.

In one or more embodiments of the present invention, all exposed portions of the portable bag hanging apparatus are composed of soft material that is quiet when it comes into contact with other objects. Advantageously, the portable bag hanging apparatus may be used in a variety of applications without disturbing the peace.

In one or more embodiments of the present invention, a portable bag hanging apparatus is small, foldable, and virtually indestructible such that it may be easily stored and transported without risk of damaging it during travel. The small and foldable nature of the portable bag hanging apparatus substantially reduces the footprint when not in use and permits easy storage for travel.

In one or more embodiments of the present invention, a portable bag hanging apparatus can maintain a disposable, recyclable, or biodegradable grocery style bag in an open state and support the weight of trash disposed therein by virtue of the attachment mechanism.

In one or more embodiments of the present invention, a portable bag hanging apparatus does not require cleaning or maintenance as it does not contain any surfaces that come into contact with refuse or garbage stored within a disposable, recyclable, or biodegradable grocery style bag.

In one or more embodiments of the present invention, a portable bag hanging apparatus is inexpensive to manufacture, enabling low market prices, such that the portable bag hanging apparatus may be a disposable, use-once, or throwaway item.

In one or more embodiments of the present invention, a portable bag hanging apparatus may be sold at rental car facilities, convenience stores, gas stations, truck stops, car washes, or other retail establishments frequented by motorists or travelers.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

The invention claimed is:

1. A portable bag hanging apparatus comprising:
   a catch end comprising a first support member disposed in a first soft outer member having a cylindrical shape;
   an attachment end comprising a second support member disposed in a second soft outer member having a cylindrical shape;
   a first cylindrical connector comprised of soft, crushable, and collapsible material wherein a first end of the first cylindrical connector is attached at an offset to a first distal end of the catch end and a second end of the first cylindrical connector is attached at the offset to a first distal end of the attachment end;
   a second cylindrical connector comprised of soft, crushable, and collapsible material wherein a first end of the second cylindrical connector is attached at the offset to a second distal end of the catch end and a second end of the second cylindrical connector is attached at the offset to a second distal end of the attachment end;
   a first mounting post attached orthogonally to the second support member and at least partially disposed within the first cylindrical connector; and
   a second mounting post attached orthogonally to the second support member and at least partially disposed within the second cylindrical connector,
   wherein all exposed portions of the portable bag hanging apparatus are composed of soft material that is quiet when it comes into contact with other objects.

2. The portable bag hanging apparatus of claim 1, wherein the first soft outer member and the second soft outer member are composed of pipe insulation, polyethylene foam, flexible polyurethane foam, or expanded polystyrene that is soft, crushable, and collapsible.

3. The portable bag hanging apparatus of claim 1, wherein the first soft outer member and the second soft outer member have an outer diameter in a range between ½ inch and 1 inch.

4. The portable bag hanging apparatus of claim 1, wherein the first soft outer member and the second soft outer member have a length in a range between 8 inches and 10 inches.

5. The portable bag hanging apparatus of claim 1, wherein the first cylindrical connector and the second cylindrical connector are composed of pipe insulation, polyethylene foam, flexible polyurethane foam, or expanded polystyrene that is soft, crushable, and collapsible.

6. The portable bag hanging apparatus of claim 1, wherein the first cylindrical connector and the second cylindrical connector have an outer diameter in a range between ½ inch and 1 inch.

7. The portable bag hanging apparatus of claim 1, wherein the first cylindrical connector and the second cylindrical connector have a length in a range between 8 inches and 12 inches.

8. The portable bag hanging apparatus of claim 1, wherein the first mounting post and the second mounting post have an outer diameter in a range between ⅛ inch and 1 inch.

9. The portable bag hanging apparatus of claim 1, wherein the first mounting post and the second mounting post have a length in a range between 1 inch and 4 inches.

10. The portable bag hanging apparatus of claim 1, wherein the offset is in a range between 1 inch and 3 inches.

11. A portable bag hanging apparatus comprising:
   a catch end comprising a first support member disposed in a first soft outer member having a cylindrical shape;
   an attachment end comprising a second support member disposed in a second soft outer member having a cylindrical shape;

a first fabric connector comprised of soft, crushable, and collapsible material wherein a first end of the first fabric connector is attached at an offset to a first distal end of the catch end and a second end of the first fabric connector is attached at the offset to a first distal end of the attachment end;

a second fabric connector comprised of soft, crushable, and collapsible material wherein a first end of the second fabric connector is attached at the offset to a second distal end of the catch end and a second end of the second fabric connector is attached at the offset to a second distal end of the attachment end;

a first mounting post attached orthogonally to the second support member and at least partially disposed within the first fabric connector; and a second mounting post attached orthogonally to the second support member and at least partially disposed within the second fabric connector, wherein all exposed portions of the portable bag hanging apparatus are composed of soft material that is quiet when it comes into contact with other objects.

12. The portable bag hanging apparatus of claim 11, wherein the first soft outer member and the second soft outer member are composed of pipe insulation, polyethylene foam, flexible polyurethane foam, or expanded polystyrene.

13. The portable bag hanging apparatus of claim 11, wherein the first soft outer member and the second soft outer member have an outer diameter in a range between ½ inch and 1 inch.

14. The portable bag hanging apparatus of claim 11, wherein the first soft outer member and the second soft outer member have a length in a range between 8 inches and 10 inches.

15. The portable bag hanging apparatus of claim 11, wherein the first fabric connector and the second fabric connector are composed of an open weave fabric, gauze, mesh, burlap, cotton, bamboo, or synthetic fibers that is soft, crushable, and collapsible.

16. The portable bag hanging apparatus of claim 11, wherein the first fabric connector and the second fabric connector have a width in a range between 1 inch and 3 inches.

17. The portable bag hanging apparatus of claim 11, wherein the first fabric connector and the second fabric connector have a length in a range between 8 inches and 12 inches.

18. The portable bag hanging apparatus of claim 11, wherein the first mounting post and the second mounting post have an outer diameter in a range between ⅛ inch and 1 inch.

19. The portable bag hanging apparatus of claim 11, wherein the first mounting post and the second mounting post have a length in a range between 1 inch and 4 inches.

20. The portable bag hanging apparatus of claim 11, wherein the offset is in a range between 1 inch and 3 inches.

* * * * *